United States Patent
Murashima

(10) Patent No.: US 8,127,608 B2
(45) Date of Patent: Mar. 6, 2012

(54) DETECTION DEVICE, GYROSENSOR, AND ELECTRONIC INSTRUMENT

(75) Inventor: Noriyuki Murashima, Suwa (JP)

(73) Assignee: Seiko Epson Corporation (JP)

( * ) Notice: Subject to any disclaimer, the term of this patent is extended or adjusted under 35 U.S.C. 154(b) by 235 days.

(21) Appl. No.: 12/685,710

(22) Filed: Jan. 12, 2010

(65) Prior Publication Data

US 2010/0107760 A1 May 6, 2010

Related U.S. Application Data

(62) Division of application No. 11/803,167, filed on May 11, 2007, now Pat. No. 7,779,687.

(30) Foreign Application Priority Data

May 12, 2006 (JP) ................................. 2006-133829
May 2, 2007 (JP) ................................. 2007-121749

(51) Int. Cl.
*G01P 9/04* (2006.01)
(52) U.S. Cl. .................................................. 73/504.12
(58) Field of Classification Search ............... 73/504.12, 73/504.14, 504.16
See application file for complete search history.

(56) References Cited

U.S. PATENT DOCUMENTS

| 5,461,916 | A | * | 10/1995 | Fujii et al. ................... 73/514.32 |
| 6,134,961 | A | | 10/2000 | Touge et al. |
| 7,068,744 | B2 | | 6/2006 | Watanabe |
| 7,069,783 | B2 | | 7/2006 | Uehara |
| 7,434,466 | B2 | | 10/2008 | Ito |

FOREIGN PATENT DOCUMENTS

| JP | 6-160100 | 6/1994 |
| JP | 2003-021516 | 1/2003 |
| JP | 2003-065768 | 3/2003 |
| JP | 2006-090706 | 4/2006 |
| WO | WO2006-23031 | 3/2006 |

* cited by examiner

*Primary Examiner* — John Chapman, Jr.
(74) *Attorney, Agent, or Firm* — Harness, Dickey & Pierce, P.L.C.

(57) ABSTRACT

A detection device includes a driver circuit and a detection circuit. The detection circuit includes an amplifier circuit which amplifies an output signal from a vibrator, a sensitivity adjustment circuit which performs sensitivity adjustment by variably controlling a gain, and a synchronous detection circuit which performs synchronous detection based on a reference signal. The sensitivity adjustment circuit is provided in the preceding stage of the synchronous detection circuit. The sensitivity adjustment circuit operates as a programmable-gain amplifier and a high-pass filter.

8 Claims, 19 Drawing Sheets

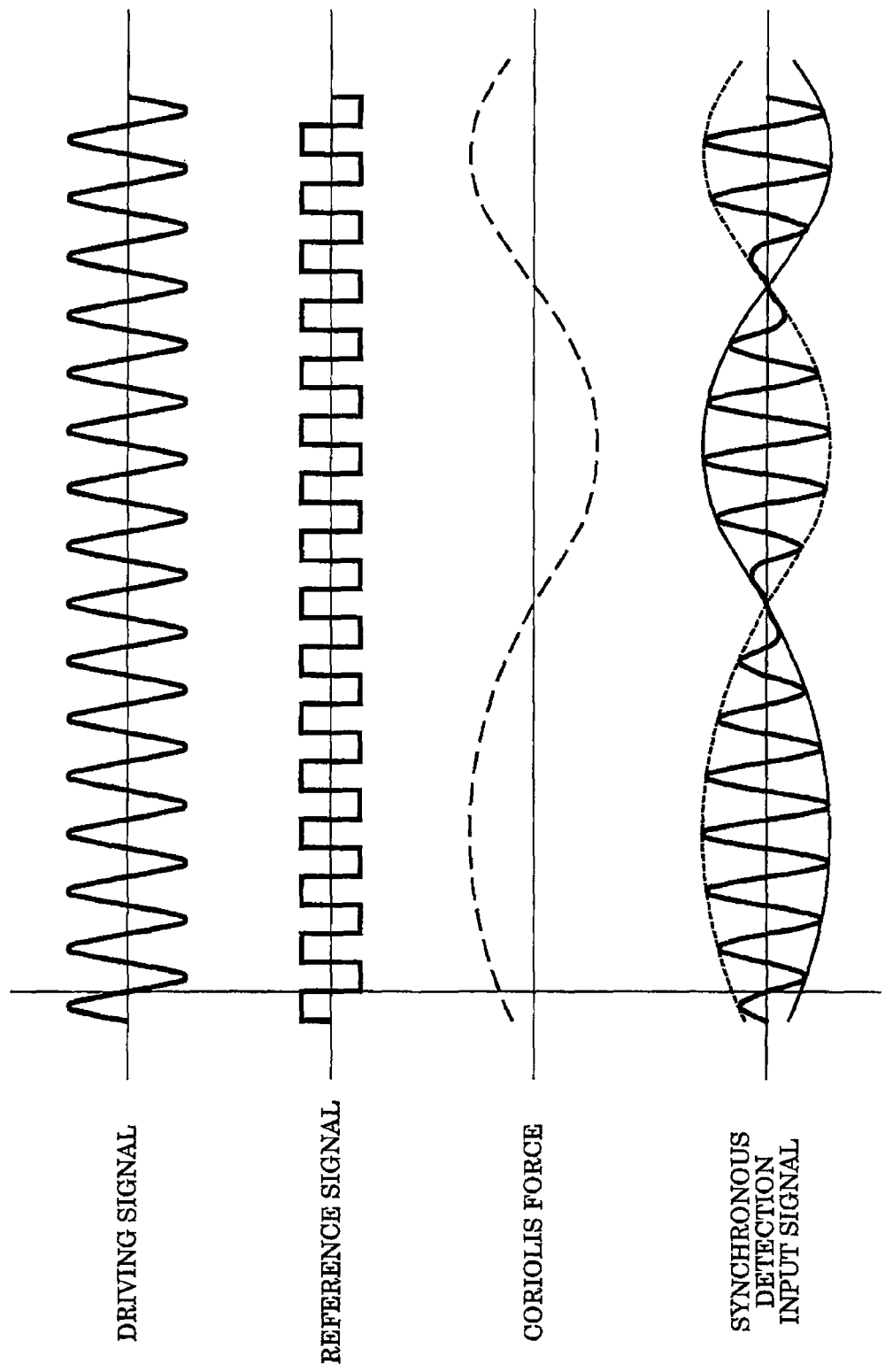

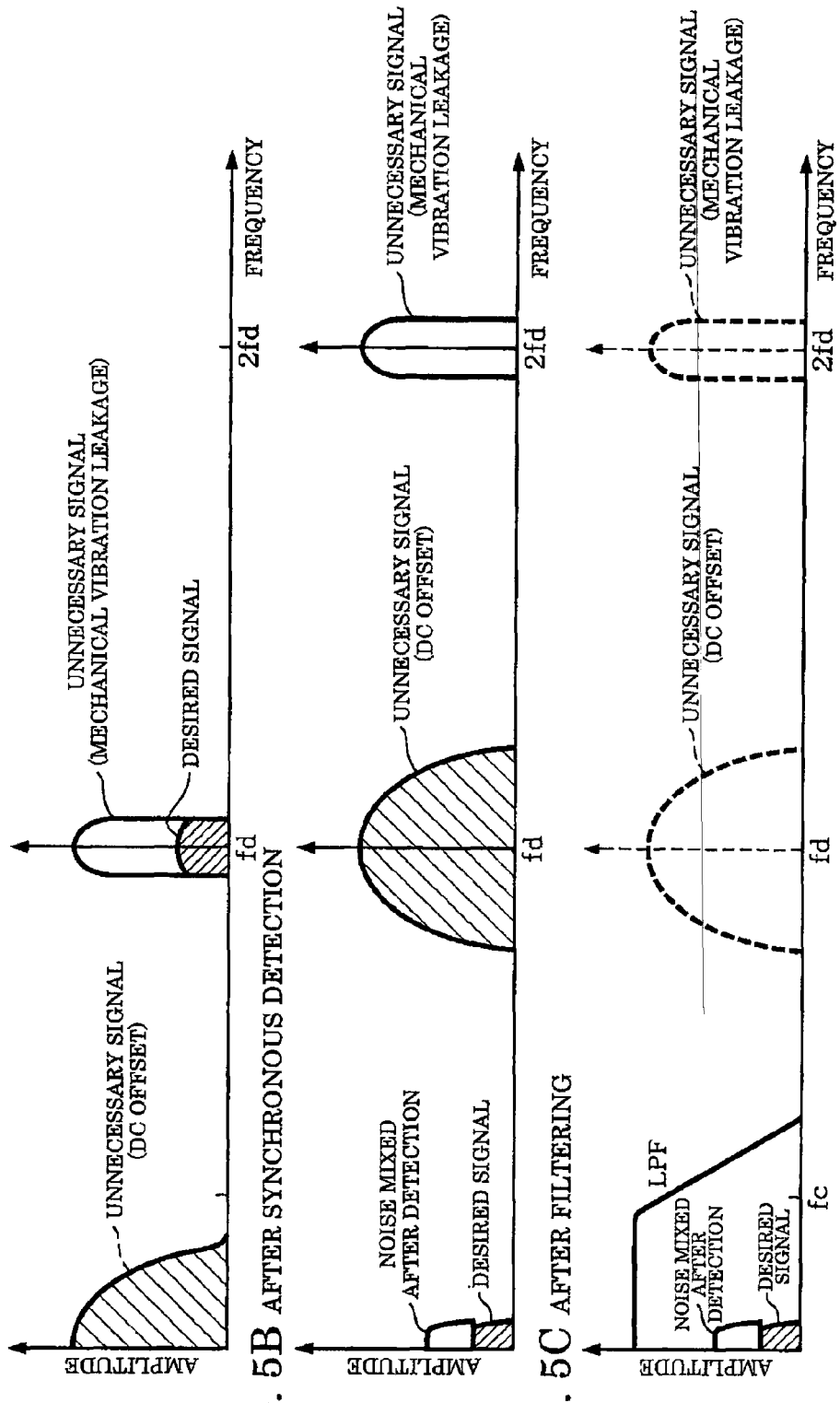

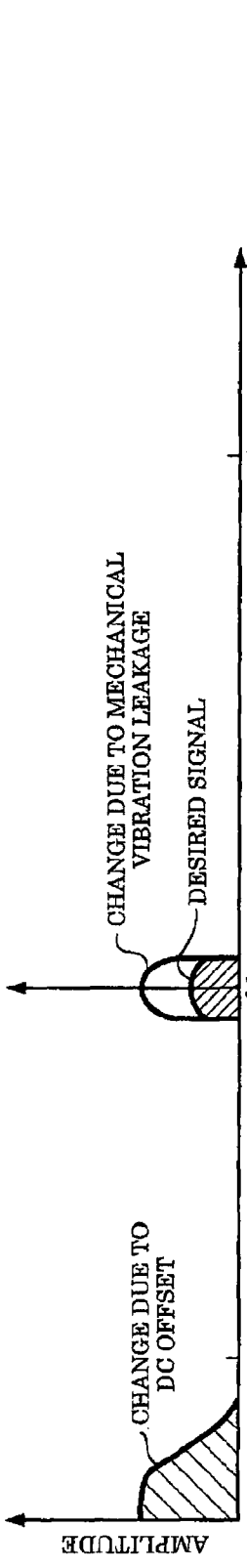
FIG. 13A BEFORE SYNCHRONOUS DETECTION
FIG. 13B AFTER SYNCHRONOUS DETECTION
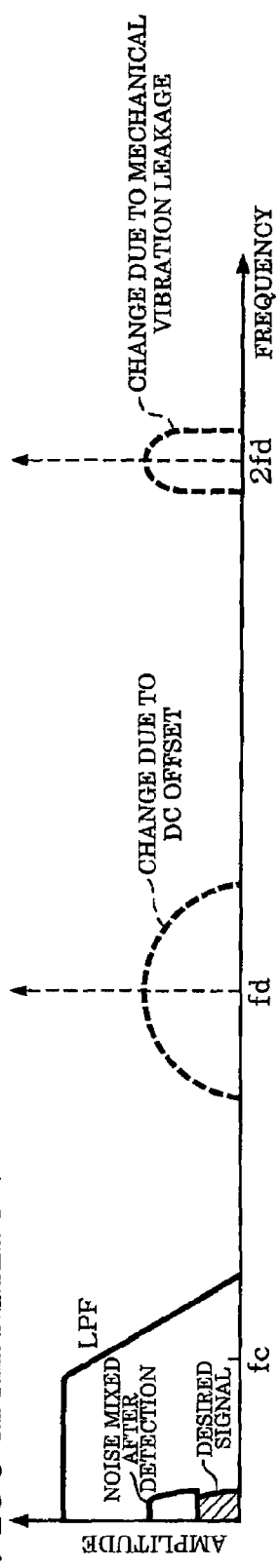
FIG. 13C AFTER FILTERING

DETECTION DEVICE, GYROSENSOR, AND ELECTRONIC INSTRUMENT

This application is a divisional of U.S. patent application Ser. No. 11/803,167 filed on May 11, 2007. This application claims the benefit of Japanese Patent Application No. 2006-133829 filed on May 12, 2006 and Japanese Patent Application No. 2007-121749 filed on May 2, 2007. The disclosures of the above applications are incorporated herein by reference.

BACKGROUND OF THE INVENTION

The present invention relates to a detection device, a gyrosensor, and an electronic instrument.

A gyrosensor (physical quantity transducer) for detecting the physical quantity which changes due to external factors is incorporated in electronic instruments such as a digital camera, a video camera, a portable telephone, and a car navigation system. The gyrosensor detects the physical quantity such as the angular velocity and is used for image blur correction, position control, GPS autonomous navigation, and the like.

In recent years, a gyrosensor has been demanded which has a reduced weight and size and exhibits high detection accuracy. Therefore, a piezoelectric vibratory gyrosensor has attracted attention as one type of gyrosensor. In particular, a crystal piezoelectric vibratory gyrosensor using a crystal as the piezoelectric material is expected to be a sensor optimum for incorporation into many devices. The vibratory gyrosensor detects the physical quantity corresponding to the Coriolis force which occurs due to rotation (JP-A-6-160100).

In the vibratory gyrosensor, an output signal (output current) from a vibrator is very weak due to a reduction in weight and size of the vibrator. Therefore, a detection device which detects a desired signal (signal corresponding to the physical quantity such as the Coriolis force) based on such a weak output signal is required to have capability of detecting the desired signal with no distortion, low noise, and a gain as large as possible.

In the vibratory gyrosensor, the sensitivity is adjusted. The term "sensitivity" used herein refers to the amount of change (slope) in the output voltage of the vibratory gyrosensor (detection device) per unit angular velocity, for example. The sensitivity is adjusted so that the amount of change coincides with a reference value.

However, when providing a sensitivity adjustment circuit for adjusting the sensitivity, the sensitivity adjustment circuit increases noise such as flicker noise (1/f noise), whereby the S/N ratio deteriorates.

SUMMARY

According to one aspect of the invention, there is provided a detection device comprising:
a driver circuit which drives a vibrator to vibrate; and
a detection circuit which receives an output signal from the vibrator and detects a desired signal, the detection circuit including:
an amplifier circuit which amplifies the output signal from the vibrator; a sensitivity adjustment circuit which performs sensitivity adjustment by variably controlling a gain; and
a synchronous detection circuit which performs synchronous detection based on a reference signal;
the sensitivity adjustment circuit being provided in a preceding stage of the synchronous detection circuit.

According to another aspect of the invention, there is provided a gyrosensor comprising:
the above detection device; and
the vibrator.

According to a further aspect of the invention, there is provided an electronic instrument comprising:
the above gyrosensor; and
a processing section which performs processes based on angular velocity information detected by the gyrosensor.

The invention may provide a detection device, a gyrosensor, and an electronic instrument which can realize sensitivity adjustment with low noise.

According one embodiment of the invention, there is provided a detection device comprising:
a driver circuit which drives a vibrator to vibrate; and
a detection circuit which receives an output signal from the vibrator and detects a desired signal, the detection circuit including:
an amplifier circuit which amplifies the output signal from the vibrator;
a sensitivity adjustment circuit which performs sensitivity adjustment by variably controlling a gain; and
a synchronous detection circuit which performs synchronous detection based on a reference signal;
the sensitivity adjustment circuit being provided in a preceding stage of the synchronous detection circuit.

According to this embodiment, the sensitivity adjustment circuit performs sensitivity adjustment by variably controlling the gain. This allows the detection device to output a signal of which the sensitivity, which is the amount of change in output voltage per unit angular velocity, has been adjusted. In this embodiment, the sensitivity adjustment circuit is provided in the preceding stage of the synchronous detection circuit. This allows sensitivity adjustment to be performed for a signal having a given frequency instead of a DC signal, whereby flicker noise can be reduced. Moreover, since the number of circuit blocks in the preceding stage of the sensitivity adjustment circuit is reduced, deterioration in the S/N ratio can be minimized which occurs when the sensitivity adjustment circuit amplifies noise generated by these circuit blocks.

In the detection device according this embodiment,
the sensitivity adjustment circuit may include:
a variable resistor of which a resistance is variably controlled based on sensitivity adjustment data; and
an operational amplifier for amplifying a signal at a gain determined by the resistance of the variable resistor.

According to this configuration, the sensitivity can be adjusted merely by monitoring the voltage of the output signal of the detection device and inputting the adjustment data which sets the sensitivity at a reference value to the sensitivity adjustment circuit, for example.

In the detection device according to this embodiment, the sensitivity adjustment circuit may operate as a programmable-gain amplifier and a high-pass filter.

According to this configuration, DC components can be cut off by the high-pass filter, whereby a situation can be prevented in which a DC signal is amplified by the sensitivity adjustment circuit. This prevents a problem in which the programmable-gain amplifier of the sensitivity adjustment circuit or the operational amplifier in the subsequent stage is saturated. Moreover, since the number of circuit blocks can be reduced, the S/N ratio can be increased.

In the detection device according to this embodiment, an operational amplifier may be used in common by the high-pass filter as an active filter and the programmable-gain amplifier.

According to this configuration, since the number of operational amplifiers as the noise source can be reduced, the S/N ratio can be increased while reducing the circuit scale.

In the detection device according to this embodiment, the sensitivity adjustment circuit may include:

a capacitor provided between an input node and a first node;

a resistor provided between the first node and a node of a first power supply voltage;

variable resistors which are provided between an output node and the node of the first power supply voltage and of which a resistance between the output node and an output tap and a resistance between the output tap and the node of the first power supply voltage are variably controlled based on sensitivity adjustment data; and an operational amplifier of which a noninverting input terminal is connected with the first node, an inverting input terminal is connected with the output tap of the variable resistors, and an output terminal is connected with the output node.

According to this configuration, since the cut-off frequency and the resistance of the variable resistor can be separately controlled, noise can be reduced by decreasing the resistance of the variable resistor while reducing the cut-off frequency.

In the detection device according to this embodiment, the sensitivity adjustment circuit may include:

a resistor provided between an input node and a first node;

a capacitor provided between the first node and a second node;

a variable resistor which is provided between an output node and the second node and of which a resistance is variably controlled based on sensitivity adjustment data; and an operational amplifier of which an inverting input terminal is connected with the second node and a noninverting input terminal is connected with a node of a first power supply voltage.

According to this configuration, the input voltage range of the operational amplifier can be increased, whereby the design of the dynamic range of the operational amplifier can be facilitated.

The detection device according to this embodiment may comprise:

an offset adjustment circuit which performs adjustment for removing an initial offset voltage of an output signal of the detection device; and a filter section which filters a signal after synchronous detection;

wherein the filter section may include:

a discrete-time filter; and a continuous-time filter provided in a preceding stage of the discrete-time filter; and wherein the continuous-time filter may have frequency characteristics of removing an offset change in an unnecessary signal due to a change in environment.

According to this embodiment, the offset adjustment circuit performs adjustment for removing the initial offset voltage. This allows the detection device to output a signal from which the initial offset voltage has been removed after offset adjustment. In this embodiment, the filter section which filters the signal after synchronous detection includes the discrete-time filter and the continuous-time filter provided in the preceding stage of the discrete-time filter, and the continuous-time filter has frequency characteristics of removing the offset change in the unnecessary signal due to a change in environment. Therefore, even if a change in environment such as a change in temperature occurs after offset adjustment, the offset change in the unnecessary signal due to the change in environment is removed by the continuous-time filter. This makes it possible to remove the offset change by effectively utilizing the continuous-time filter provided in the preceding stage of the discrete-time filter without providing a special circuit which removes the offset change.

In the detection device according to this embodiment, the continuous-time filter may have frequency characteristics of attenuating an offset change in an unnecessary signal which appears in a frequency band of a frequency k×fd (k is a positive integer) due to synchronous detection by the synchronous detection circuit to a value equal to or smaller than amplitude of the desired signal.

According to this configuration, the offset change which appears in the frequency band of the frequency k×fd due to synchronous detection can be removed by effectively utilizing the continuous-time filter. Therefore, the offset change can be efficiently removed.

In the detection device according to this embodiment, the continuous-time filter may have frequency characteristics of attenuating offset changes in unnecessary signals which appear in frequency bands of frequencies fd, 2fd, and 3fd to values equal to or smaller than the amplitude of the desired signal.

According to this configuration, even if the offset changes in the unnecessary signals appear at the frequencies fd, 2fd, and 3fd due to synchronous detection, the offset changes can be reliably and easily removed.

In the detection device according to this embodiment, the continuous-time filter may be a first-order low-pass filter; and when the amplitude of the desired signal is A0, the offset change in the unnecessary signal which appears at the frequency k×fd is $\Delta Ak$, and an attenuation factor of the filter at the frequency fd is a, the continuous-time filter may have frequency characteristics of attenuating the offset change in the unnecessary signal so that $\Delta Ak \times (a/k) \leq A0$ is satisfied.

According to this configuration, when using the first-order low-pass filter as the continuous-time filter, a filter which can remove the offset change at the frequency k×fd can be easily realized.

In the detection device according to this embodiment, the continuous-time filter may be a second-order low-pass filter; and when the amplitude of the desired signal is A0, the offset change in the unnecessary signal which appears at the frequency k×fd is $\Delta Ak$, and an attenuation factor of the filter at the frequency fd is a, the continuous-time filter may have frequency characteristics of attenuating the offset change in the unnecessary signal so that $\Delta Ak \times (a/k^2) \leq A0$ is satisfied.

According to this configuration, when using the second-order low-pass filter as the continuous-time filter, a filter which can remove the offset change at the frequency k×fd can be easily realized.

In the detection device according to this embodiment, the discrete-time filter may be a switched-capacitor filter.

In the detection device according to this embodiment, the switched-capacitor filter may operate based on a clock signal corresponding to the reference signal.

This configuration allows the clock frequency of the switched-capacitor filter to coincide with the frequency of the reference signal, whereby the relationship between the frequency characteristics of the filter and synchronous detection is simplified. This facilitates design and the like.

In the detection device according to this embodiment, the discrete-time filter may have frequency characteristics of removing a component having a detuning frequency $\Delta f = |fd - fs|$ corresponding to a difference between a driving-side resonance frequency fd and a detection-side resonance frequency fs of the vibrator and allowing a frequency component of the desired signal to pass through.

According to this configuration, even if the detuning frequency Δf is sufficiently lower than the frequency fd, the component of the unnecessary signal having the detuning frequency Δf can be reliably and easily removed. Moreover, the offset change in the unnecessary signal which appears in the frequency band of the frequency k×fd can be removed using the continuous-time filter while removing the unnecessary signal having the detuning frequency Δf using the discrete-time filter. Therefore, the unnecessary signal and the offset change can be efficiently removed.

According to another embodiment of the invention, there is provided a gyrosensor comprising:
the above detection device; and
the vibrator.

According to a further embodiment of the invention, there is provided an electronic instrument comprising:
the above gyrosensor; and
a processing section which performs processes based on angular velocity information detected by the gyrosensor.

Preferred embodiments of the invention are described below in detail. Note that the embodiments described below do not in any way limit the scope of the invention defined by the claims laid out herein. Note that all elements of the embodiments described below should not necessarily be taken as essential requirements for the invention.

BRIEF DESCRIPTION OF THE SEVERAL VIEWS OF THE DRAWING

FIG. 4 shows a signal waveform example illustrative of the operation of the detection device.

FIGS. 5A to 5C show examples of frequency spectra.

FIGS. 13A to 13C show examples of frequency spectra.

DETAILED DESCRIPTION OF THE EMBODIMENT

1. Electronic Instrument and Gyrosensor

Figure 1:
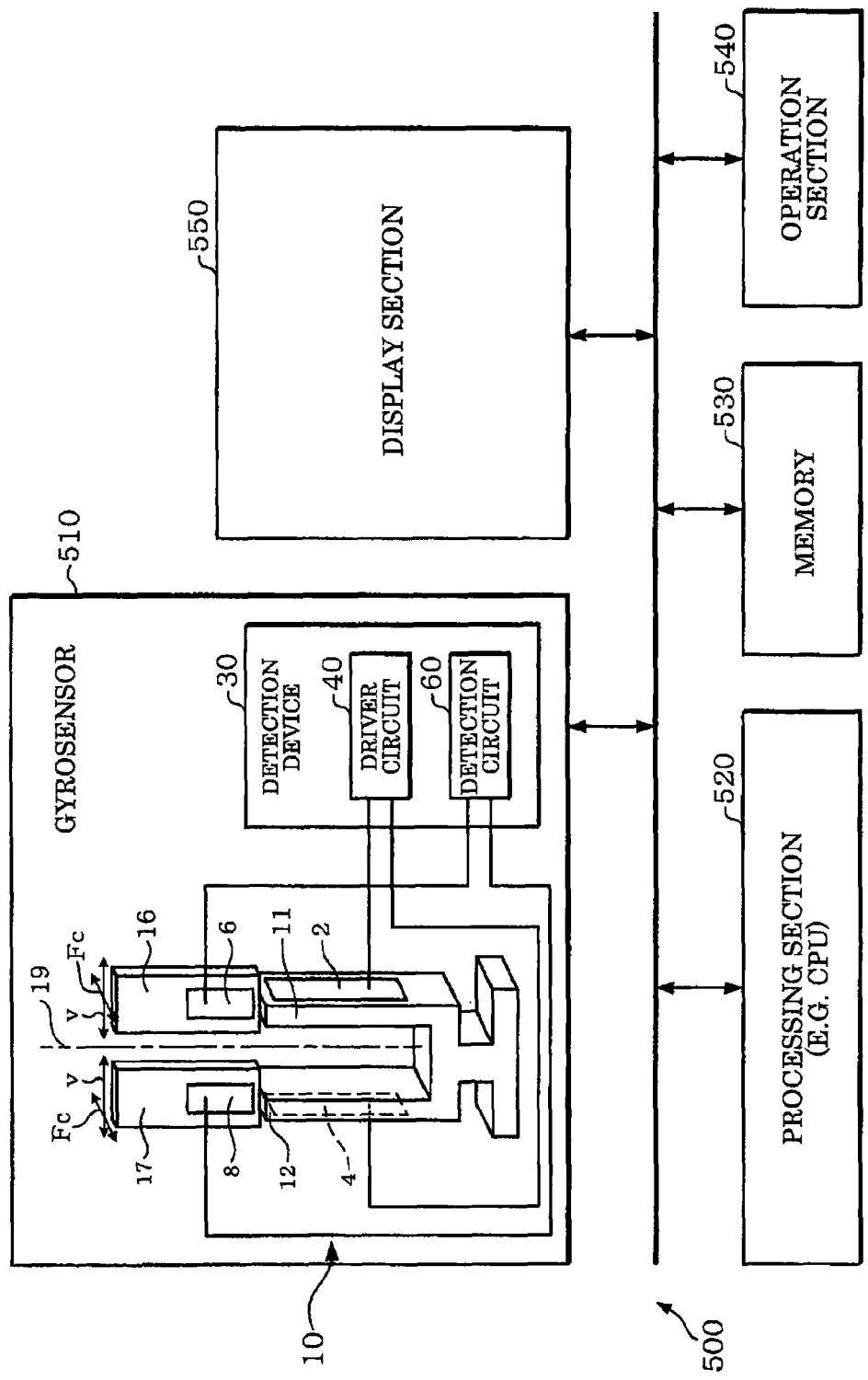
FIG. 1 shows a configuration example of an electronic instrument and a gyrosensor.

FIG. 1 shows a configuration example of a gyrosensor 510 including a detection device 30 and an electronic instrument 500 including the gyrosensor 510 according to this embodiment. The electronic instrument 500 and the gyrosensor 510 are not limited to the configuration shown in FIG. 1. Various modification may be made such as omitting some of the elements or adding other elements. As the electronic instrument 500 according to this embodiment, various electronic instruments such as a digital camera, a video camera, a portable telephone, a car navigation system, a robot, a game machine, and a personal digital assistant may be considered.

The electronic instrument 500 includes the gyrosensor 510 and a processing section 520. The electronic instrument 500 may also include a memory 530, an operation section 540, and a display section 550. The processing section (e.g. CPU or MPU) 520 controls the gyrosensor 510 and the like, and controls the entire electronic instrument 500. The processing section 520 performs processes based on angular velocity information (physical quantity) detected by the gyrosensor (physical quantity transducer) 510. For example, the processing section 520 performs processes for image blur correction, position control, GPS autonomous navigation, and the like based on the angular velocity information. The memory (e.g. ROM or RAM) 530 stores a control program and various types of data, and functions as a work area and a data storage area. The operation section 540 allows the user to operate the electronic instrument 500, and the display section 550 displays various types of information for the user.

The gyrosensor 510 includes a vibrator 10 (wave transducer) and the detection device 30. The vibrator 10 shown in FIG. 1 is a tuning-fork piezoelectric vibrator formed of a thin sheet of a piezoelectric material such as a crystal, and includes driving vibrators 11 and 12 and detection vibrators 16 and 17. The driving vibrators 11 and 12 are respectively provided with driving terminals 2 and 4, and the detection vibrators 16 and 17 are respectively provided with detection terminals 6 and 8.

A driver circuit 40 included in the detection device 30 outputs a driving signal (driving voltage) to drive the vibrator 10 (physical quantity transducer in a broad sense), and receives a feedback signal from the vibrator 10. The driver circuit 40 thus causes the vibrator 10 to vibrate. A detection circuit 60 receives a detection signal (detection current or charges) from the vibrator 10 driven by the driving signal, and detects (extracts) a desired signal (Coriolis force signal) from the detection signal.

Specifically, the alternating-current driving signal (driving voltage) from the driver circuit 40 is applied to the driving terminal 2 of the driving vibrator 11. This causes the driving vibrator 11 to start to vibrate due to the reverse voltage effect, and the driving vibrator 12 also starts to vibrate due to the tuning-fork vibration. A current (charges) generated by the piezoelectric effect of the driving vibrator 12 is fed back to the driver circuit 40 from the driving terminal 4 as a feedback signal. This allows an oscillation loop including the vibrator 10 to be formed.

When the driving vibrators 11 and 12 vibrate, the detection vibrators 16 and 17 vibrate in the directions shown in FIG. 1 at a vibration velocity v. A current (charges) generated by the piezoelectric effect of the detection vibrators 16 and 17 is output from the detection terminals 6 and 8 as a detection signal. The detection circuit 60 receives the detection signal from the vibrator 10, and detects the desired signal (desired wave) which is the signal corresponding to the Coriolis force. Specifically, when the vibrator 10 (gyrosensor) rotates around a detection axis 19, a Coriolis force Fc occurs in the directions perpendicular to the vibration directions at the vibration velocity v. For example, when the angular velocity of the vibrator when the vibrator rotates around the detection axis 19 is ω, the mass of the vibrator is m, and the vibration velocity of the vibrator is v, the Coriolis force is indicated by Fc=2m·v·ω. Therefore, the rotation angular velocity ω of the gyrosensor (vibrator) can be determined by causing the detection circuit 60 to detect (extract) the desired signal (sensor signal) which is the signal corresponding to the Coriolis force. The processing section 520 can perform various processes for image blur correction, position control, GPS autonomous navigation, and the like using the determined angular velocity ω.

The vibrator 10 has a driving-side resonance frequency fd and a detection-side resonance frequency fs. Specifically, the natural resonance frequency (natural resonance frequency in driving vibration mode) of the driving vibrators 11 and 12 is the frequency fd, and the natural resonance frequency (natural resonance frequency in detection vibration mode) of the detection vibrators 16 and 17 is the frequency fs. In this case, a constant frequency difference is provided between the frequencies fd and fs so that the driving vibrators 11 and 12 and the detection vibrators 16 and 17 do not undergo unnecessary resonant coupling. A detuning frequency Δf=|fd−fs| which is the above difference in frequency is set at a value sufficiently lower than the frequencies fd and fs.

FIG. 1 shows an example in which the vibrator 10 is a tuning-fork vibrator. Note that the vibrator 10 according to this embodiment is not limited to the structure shown in FIG. 1. For example, the vibrator 10 may be a T-shaped vibrator, double-T-shaped vibrator, or the like. The piezoelectric material for the vibrator 10 may be a material other than a crystal.

2. Detection Device

Figure 2:
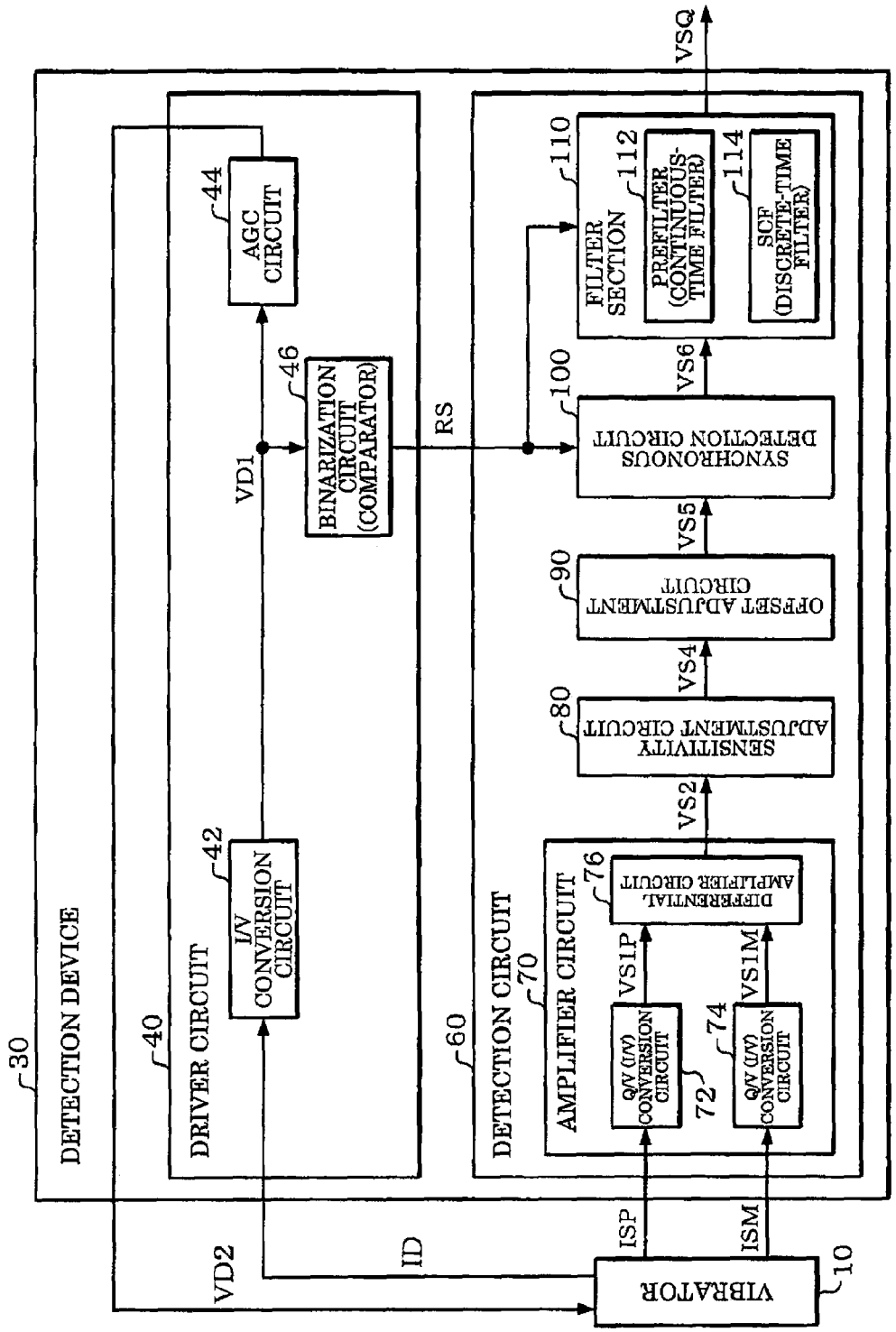
FIG. 2 shows a configuration example of a detection device.

FIG. 2 shows a configuration example of the detection device 30 according to this embodiment. The detection device 30 is not limited to the configuration shown in FIG. 2. Various modification may be made such as omitting some of the elements or adding other elements.

The detection device 30 includes the driver circuit 40 which drives the vibrator 10 to vibrate, and the detection circuit 60 which receives the output signal (current or charges) from the vibrator 10 and detects the desired signal (desired wave).

The driver circuit (oscillation circuit) 40 includes an I/V conversion circuit 42 which converts current into voltage, an automatic gain control (AGC) circuit 44 which performs automatic gain control, and a binarization circuit (comparator) 46. The driver circuit 40 must maintain a constant amplitude of the driving voltage supplied to the vibrator 10 (driving vibrator) in order to maintain constant sensitivity of the gyrosensor. Therefore, the AGC circuit 44 for automatic gain adjustment is provided in the oscillation loop of the driving vibration system. In more detail, the AGC circuit 44 variably and automatically adjusts the gain so that the amplitude of an input signal ID (vibration velocity v of the vibrator) becomes constant. Note that the phase is adjusted so that the phase shift in the oscillation loop becomes zero degrees. In order to enable high-speed oscillation startup, the gain in the oscillation loop is set at a value larger than one when starting oscillation.

The I/V conversion circuit 42 converts a current (charges) as the signal ID from the vibrator 10 into voltage, and outputs the voltage as a driving signal VD1. The I/V conversion circuit 42 may be realized using a capacitor, a resistor, and an operational amplifier.

The AGC circuit 44 monitors the driving signal VD1 and controls the gain in the oscillation loop. The AGC circuit 44 may include a gain control amplifier (GCA) for controlling the oscillation amplitude in the oscillation loop, and a gain control circuit which outputs a control voltage for adjusting the gain of the gain control amplifier corresponding to the oscillation amplitude. The gain control circuit may include a rectifier circuit (full-wave rectifier) which converts the alternating-current driving signal VD1 from the I/V conversion circuit 42 into a direct-current signal, a circuit which outputs the control voltage corresponding to the difference between the voltage of the direct-current signal from the rectifier circuit and a reference voltage, and the like.

The binarization circuit 46 binarizes the driving signal VD1 as a sine wave, and outputs a reference signal (synchronization signal) RS obtained by binarization to a synchronous detection circuit 100. The binarization circuit 46 also outputs the reference signal RS to a filter section 110 (SCF 114). The binarization circuit 46 may be realized by a comparator to which the sine-wave (alternating-current) signal VD1 from the I/V conversion circuit 42 is input and which outputs the rectangular-wave reference signal RS. Another circuit may be provided between the I/V conversion circuit 42 and the binarization circuit 46 or between the binarization circuit 46 and the synchronous detection circuit 100. For example, a high-pass filter, a phase-shift circuit (phase shifter), or the like may be provided.

The detection circuit 60 includes an amplifier circuit 70, a sensitivity adjustment circuit 80, an offset adjustment circuit 90, the synchronous detection circuit 100, and the filter section 110. The detection circuit 60 may have a configuration in which some of these circuits and sections are omitted.

The amplifier circuit 70 amplifies output signals ISP and ISM from the vibrator 10. The amplifier circuit 70 includes Q/V conversion circuits 72 and 74 and a differential amplifier circuit 76. The Q/V conversion circuits 72 and 74 respectively receive the signals ISP and ISM from the vibrator 10, and convert charges (current) generated by the vibrator 10 into voltages. The differential amplifier circuit 76 differentially amplifies signals VS1P and VS1M from the Q/V conversion circuits 72 and 74.

Figure 3A:
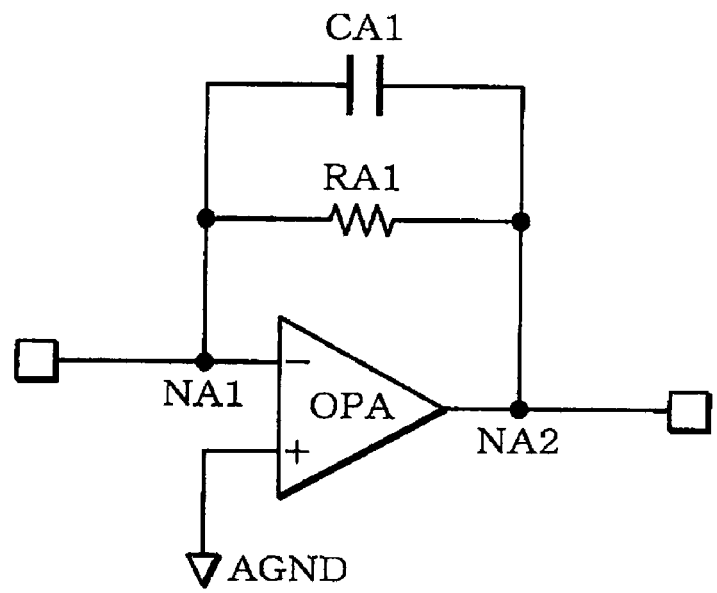
FIGS. 3A and 3B show configuration examples of a Q/V (I/V) conversion circuit and a differential amplifier circuit.

FIG. 3A shows a configuration example of the Q/V (I/V) conversion circuits 72 and 74. Each of the Q/V conversion circuits 72 and 74 includes a feedback capacitor CA1 and a feedback resistor RA1 provided between nodes NA1 and NA2 and an operational amplifier OPA, and has low-pass filter frequency characteristics. The input node NA1 is connected with an inverting input terminal (−) of the operational amplifier OPA, and a node of a reference power supply voltage AGND (analog ground) is connected with a noninverting input terminal (+).

When causing the circuit shown in FIG. 3A to function as the Q/V conversion circuit, the capacitance of the capacitor CA1 and the resistance of the resistor RA1 are set so that a cut-off frequency fc=1/2πCR is sufficiently lower than the resonance frequency fd. This causes a phase shift of about −90 degrees to occur at the resonance frequency fd. When causing the circuit shown in FIG. 3A to function as the I/V conversion circuit, the capacitance of the capacitor CA1 and the resistance of the resistor RA1 are set so that the cut-off frequency fc=1/2πCR is sufficiently higher than the resonance frequency fd. In this case, since the phase shift occurs to only a small extent, a phase-shift circuit is necessary which causes the phase of the reference signal RS to shift by +90 degrees or −90 degrees.

Figure 3B:
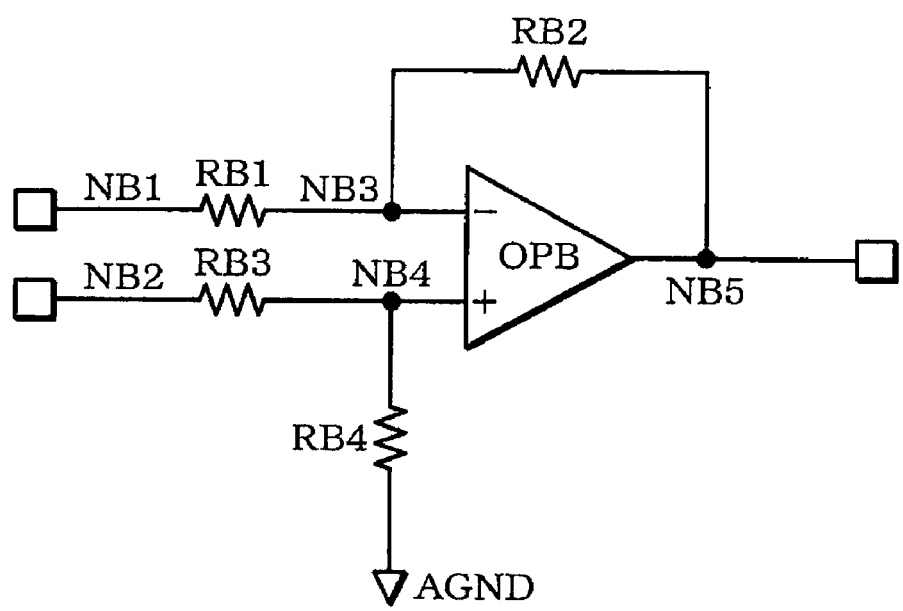

FIG. 3B shows a configuration example of the differential amplifier circuit 76. The differential amplifier circuit 76 includes resistors RB1, RB2, RB3, and RB4 and an operational amplifier OPB. The differential amplifier circuit 76 shown in FIG. 3B amplifies the difference between the first and second input signals (VS1P and VS1M) with opposite phases by equalizing the resistance ratio of the resistors RB1 and RB2 and the resistance ratio of the resistors RB3 and RB4. This removes an electrostatic coupling leakage signal which is an unnecessary signal (interference signal) with the same phase as the sensor signal (desired signal).

The sensitivity adjustment circuit 80 shown in FIG. 2 performs sensitivity adjustment. Specifically, the sensitivity adjustment circuit 80 performs sensitivity adjustment by variably controlling the gain. The sensitivity adjustment circuit 80 may include a variable resistor of which the resistance is variably controlled based on sensitivity adjustment data, an operational amplifier for amplifying a signal with a gain (amplification factor) determined by the resistance (resistance ratio) of the variable resistor, and the like. It is desirable that the sensitivity adjustment circuit 80 operate as a programmable-gain amplifier and a high-pass filter. It is more desirable that the operational amplifier be used in common by the high-pass filter (active filter) and the programmable-gain amplifier.

The offset adjustment circuit 90 performs offset adjustment. Specifically, the offset adjustment circuit 90 removes the initial offset voltage of an output signal VSQ of the detection device 30. For example, the offset adjustment circuit 90 performs offset adjustment so that the voltage of the output signal VSQ coincides with the reference output voltage at a typical temperature of 25° C.

The synchronous detection circuit (detection circuit or detector) 100 subjects an amplified signal VS5 to synchronous detection based on the reference signal (reference clock signal) RS. A mechanical vibration leakage signal which is an unnecessary signal having a phase difference of 90 degrees from the sensor signal can be removed by synchronous detection.

The filter section 110 filters a signal VS6 obtained after synchronous detection. Specifically, the filter section 110 performs low-pass filtering of removing high-frequency components.

FIG. 4 shows a signal waveform example illustrative of the operation of the detection device 30. The driving signal VD1 is a sine wave of which the frequency is the driving-side natural frequency fd. The rectangular-wave reference signal RS is obtained by binarizing the driving signal VD1 using the binarization circuit 46. The signal VS5 (sensor signal) input to the synchronous detection circuit 100 has been subjected to amplitude modulation (AM) corresponding to the amount of Coriolis force (angular velocity). The DC component of the desired signal is output as the signal VSQ by synchronously detecting the signal VS5 using the reference signal RS and smoothing the resulting signal VS6 using the filter section 110. Specifically, the voltage level of the signal VSQ is adjusted to the voltage level corresponding to the amount of Coriolis force, and the rotation angular velocity of the gyrosensor can be obtained by determining the voltage level of the signal VSQ.

3. Unnecessary Signal

The sensor signal includes the desired signal (desired wave) and the unnecessary signal (unnecessary wave) in a mixed state. Since the amplitude of the unnecessary signal is generally significantly greater than the amplitude of the desired signal, high performance is required for the detection device 30. Examples of the unnecessary signal include an unnecessary signal caused by mechanical vibration leakage, an unnecessary signal caused by electrostatic coupling leakage, an unnecessary signal caused by the detuning frequency $\Delta f$, an unnecessary signal caused by the frequency 2fd (2$\omega$d), an unnecessary signal caused by DC offset, and the like.

The unnecessary signal caused by mechanical vibration leakage occurs due to the imbalance of the shape of the vibrator 10 and the like. Since the unnecessary signal caused by mechanical vibration leakage and superimposed on the signal ISP has a phase opposite to that of the unnecessary signal caused by mechanical vibration leakage and superimposed on the signal ISM, the unnecessary signal cannot be removed by the differential amplifier circuit 76. However, since the unnecessary signal caused by mechanical vibration leakage and superimposed on the signal VS5 has a phase difference of 90 degrees from the desired signal, the unnecessary signal can be removed by the synchronous detection circuit 100. The unnecessary signal caused by electrostatic coupling leakage occurs when the driving signal VD2 leaks into input terminals of the signals ISP and ISM and the like through parasitic capacitors. Since the unnecessary signal caused by electrostatic coupling leakage and superimposed on the signal ISP has the same phase as that of the unnecessary signal caused by electrostatic coupling leakage and superimposed on the signal ISM, the unnecessary signal can be removed by the differential amplifier circuit 76. The unnecessary signal caused by the frequency 2fd occurs when the vibrator vibrates at a harmonic frequency of 2fd for some reasons. The unnecessary signal caused by DC offset occurs due to an input leakage, an electrostatic coupling leakage imbalance, a phase shift between the sensor signal and the reference signal, the difference in reference signal duty cycle, the DC offset of the circuit block, and the like.

A method of removing the unnecessary signal is described below in detail with reference to frequency spectra shown in FIGS. 5A to 5C. FIG. 5A shows the frequency spectrum before synchronous detection. As shown in FIG. 5A, an unnecessary signal caused by DC offset exists in the sensor signal before synchronous detection in the DC frequency band. An unnecessary signal caused by mechanical vibration leakage and the desired signal exist in the fd frequency band.

FIG. 5B shows the frequency spectrum after synchronous detection. The desired signal in the fd frequency band shown in FIG. 5A appears in the DC and fd frequency bands after synchronous detection, as shown in FIG. 5B. The unnecessary signal (DC offset) in the DC frequency band shown in FIG. 5A appears in the fd frequency band after synchronous detection, as shown in FIG. 5B. The unnecessary signal (mechanical vibration leakage) in the fd frequency band shown in FIG. 5A appears in the 2fd frequency band after synchronous detection, as shown in FIG. 5B. When an unnecessary signal exists in the 2fd frequency band in FIG. 5A, the unnecessary signal appears in the 3fd and fd frequency bands after synchronous detection. Noise mixed after detection is noise generated by the circuit in the subsequent stage of the synchronous detection circuit 100, for example.

FIG. 5C shows the frequency spectrum after filtering. The frequency components of the unnecessary signals in the frequency bands of the frequencies fd, 2fd, and the like have been removed by smoothing (LPF) the signal after synchronous detection using the filter section 110.

Since the desired signal has been subjected to amplitude modulation, as described with reference to FIG. 4, the desired signal may be indicated by $A(t)\sin(\omega d \times t)$. Since the unnecessary signal (interference wave) caused by mechanical vibration leakage has a phase shift from the desired signal by 90 degrees, the unnecessary signal may be indicated by $B \sin(\omega d \times t + \pi/2)$. Since the sensor signal is the sum of the desired signal and the unnecessary signal, the sensor signal may be indicated by $A(t)\sin(\omega d \times t) + B \sin(\omega d \times t + \pi/2)$. The driving signal may be indicated by $C \sin(\omega d \times t)$. Note that $A(t)$, B, and C are amplitudes, and $\omega d = 2\pi f d$.

The term "synchronous detection" may be considered to be multiplication of the sensor signal and the driving signal (reference signal). Therefore, the desired signal contained in the sensor signal is indicated by $A(t)\sin(\omega d \times t) \times C \sin(\omega d \times t) = \{(A(t) \times C)/2\} \times \{1 - \cos(2\omega d \times t)\}$. Accordingly, the desired signal appears in the DC and 2fd frequency bands after synchronous detection, as shown in FIG. 5B.

On the other hand, the unnecessary signal caused by mechanical vibration leakage and contained in the sensor signal is indicated by $B \sin(\omega d \times t + \pi/2) \times C \sin(\omega d \times t) = \{-(B \times C)/2\} \times \cos(2\omega d \times t + \pi/2)$. Accordingly, the unnecessary signal caused by mechanical vibration leakage appears in the 2fd ($2\omega d$) frequency band after synchronous detection, but does not appear in the DC frequency band.

Synchronous detection is described below with reference to schematic views shown in FIGS. 6A to 6D. In the actual situation, the amplitude B of the unnecessary signal (mechanical vibration leakage) is significantly greater than the amplitude $A(t)$ of the desired signal. In FIGS. 6A to 6D, the amplitudes $A(t)$ and B are illustrated to be equal for convenience of illustration.

Figure 6A:
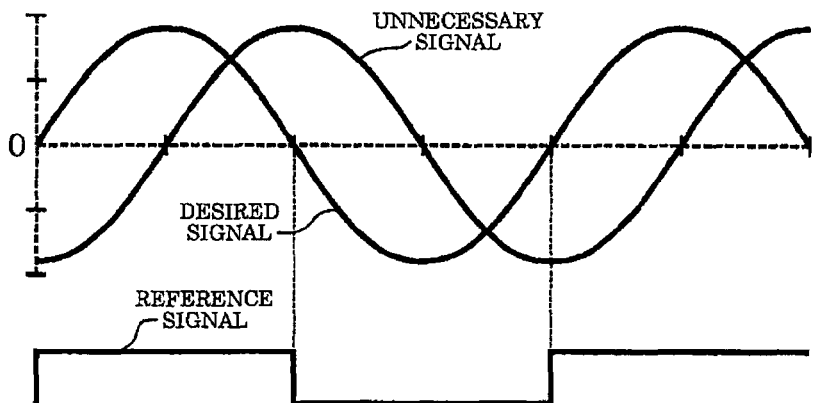
FIGS. 6A to 6D are views illustrative of synchronous detection.
Figure 6B:
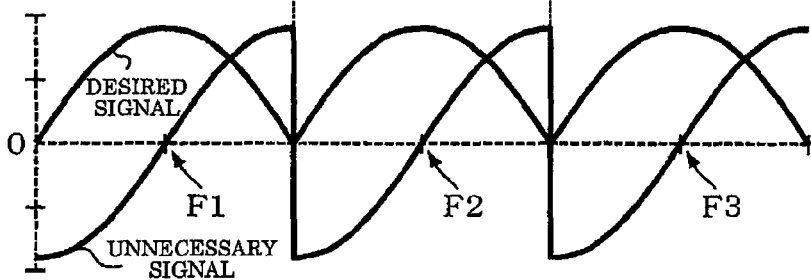

When the phase of the desired signal completely coincides with the phase of the reference signal (driving signal), as shown in FIG. 6A, the desired signal and the unnecessary signal after synchronous detection have the waveforms shown in FIG. 6B. Specifically, the desired signal has a complete full-wave rectified waveform, and the unnecessary signal has a waveform in which the area of the positive portion is the same as the area of the negative portion. Therefore, the DC component of the desired signal is output as the signal VSQ by smoothing the signal using the filter section 110, whereby the component of the unnecessary signal does not appear as the signal VSQ.

Figure 6C:
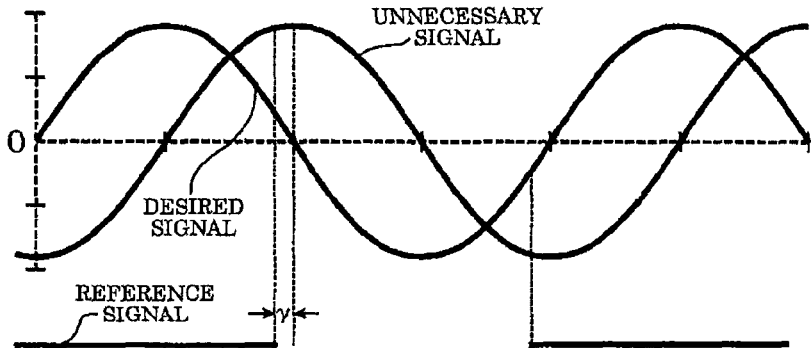
Figure 6D:
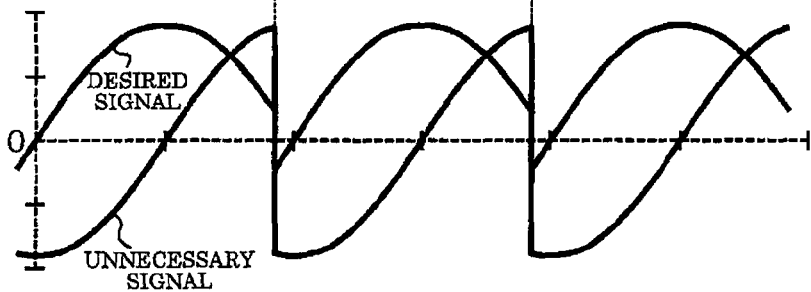

On the other hand, when the phase of the desired signal differs from the phase of the reference signal (driving signal) by γ, as shown in FIG. 6C, the desired signal and the unnecessary signal after synchronous detection have the waveforms shown in FIG. 6D. Specifically, the desired signal does not have a complete full-wave rectified waveform, but contains a negative component. The unnecessary signal has a waveform in which the area of the positive portion differs from the area of the negative portion. Therefore, the DC component of the desired signal in the signal VSQ obtained by smoothing using the filter section 110 is reduced in comparison with FIG. 6B, and the component of the unnecessary signal appears as the signal VSQ.

4. Sensitivity Adjustment

Figure 7:
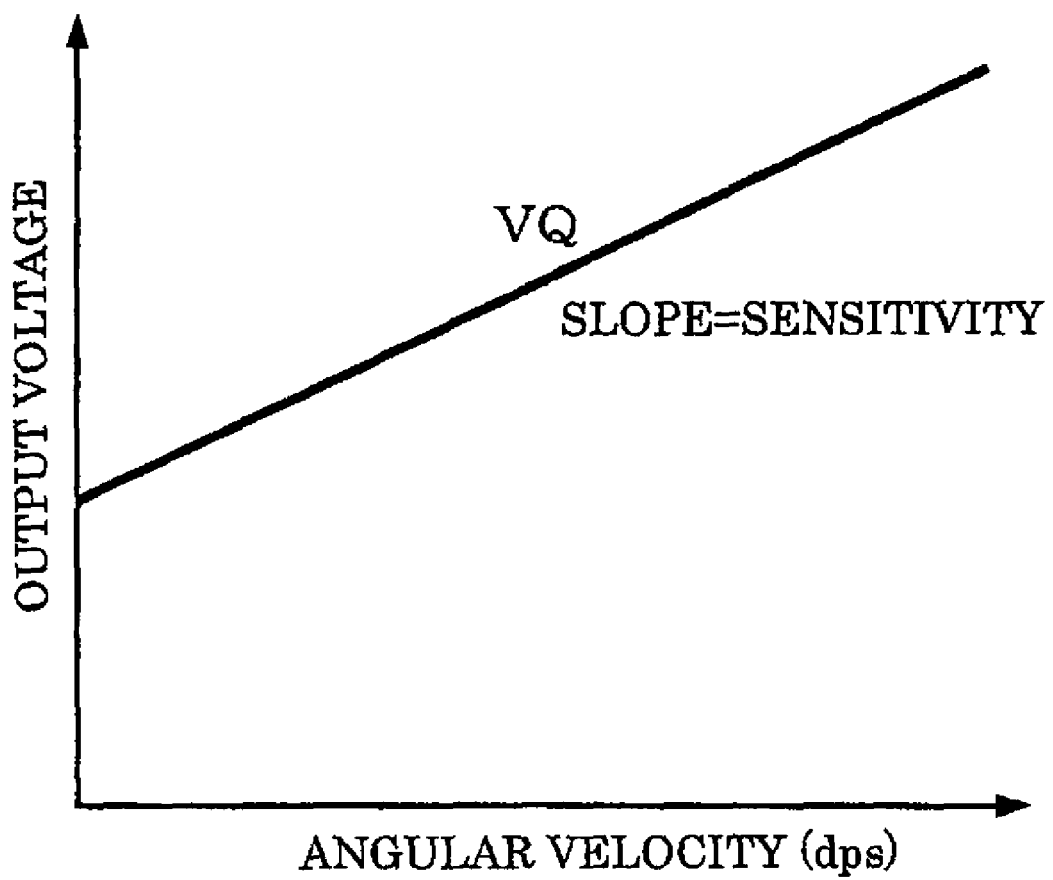
FIG. 7 is a view illustrative of sensitivity adjustment.

The gyrosensor 510 performs sensitivity adjustment of adjusting the gain of the entire detection device 30 so that the sensitivity coincides with a given reference value. The sensitivity (V/degree/sec) refers to the amount of change in the output voltage VQ (voltage of the signal VSQ) shown in FIG. 7 per unit angular velocity, and corresponds to the slope of the straight line of the output voltage VQ. An offset adjustment described later is performed after sensitivity adjustment.

A circuit which adjusts the sensitivity is generally provided in the subsequent stage of the filter section 110 shown in FIG. 2 from the viewpoint of easy and simple sensitivity adjustment. Specifically, the sensitivity is generally adjusted after obtaining a direct-current (DC) signal by removing the unnecessary signal and the like.

However, it was found that system noise is increased when providing the sensitivity adjustment circuit in the subsequent stage of the filter section 110. Specifically, when adjusting the sensitivity after obtaining the DC signal as a result of low-pass filtering by the filter section 110, noise generated by the sensitivity adjustment circuit appears in the output voltage VQ. Since flicker noise (1/f noise) is increased as the frequency becomes lower, the adverse effect of flicker noise is increased if sensitivity adjustment is performed for the DC signal. Moreover, when providing the sensitivity adjustment circuit which performs gain adjustment in the subsequent stage of the filter section 110, noise generated by the circuit in the preceding stage of the sensitivity adjustment circuit is amplified in addition to the desired signal, whereby the S/N ratio deteriorates.

In this embodiment, the sensitivity adjustment circuit 80 is provided in the preceding stage of the synchronous detection circuit (detector) 100, as shown in FIG. 2. Specifically, the sensitivity adjustment circuit 80 is provided between the amplifier circuit 70 and the synchronous detection circuit 100 (offset adjustment circuit).

The sensitivity adjustment is performed for the signal having the frequency fd instead of the DC signal by providing the sensitivity adjustment circuit 80 in the preceding stage of the synchronous detection circuit 100. Therefore, the adverse effect of flicker noise (1/f noise), which is reduced as the frequency becomes higher, can be minimized. Moreover, noise generated by the sensitivity adjustment circuit 80 appears in the fd frequency band by synchronous detection, as shown in FIG. 5B, and can be removed by the filter section 110. Therefore, the adverse effect of noise generated by the sensitivity adjustment circuit 80 can also be reduced. In addition, since the number of circuit blocks provided in the preceding stage of the sensitivity adjustment circuit 80 is reduced in comparison with the case of providing the sensitivity adjustment circuit in the subsequent stage of the filter section 110, deterioration in the S/N ratio can be minimized which occurs when the sensitivity adjustment circuit 80 amplifies noise generated by these circuit blocks.

5. Configuration of Sensitivity Adjustment Circuit

Figure 8A:
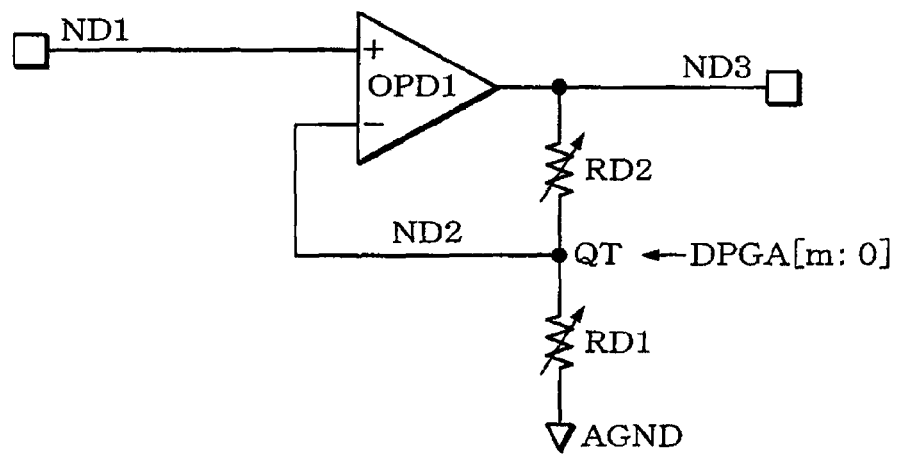
FIGS. 8A and 8B show configuration examples of a sensitivity adjustment circuit.
Figure 8B:
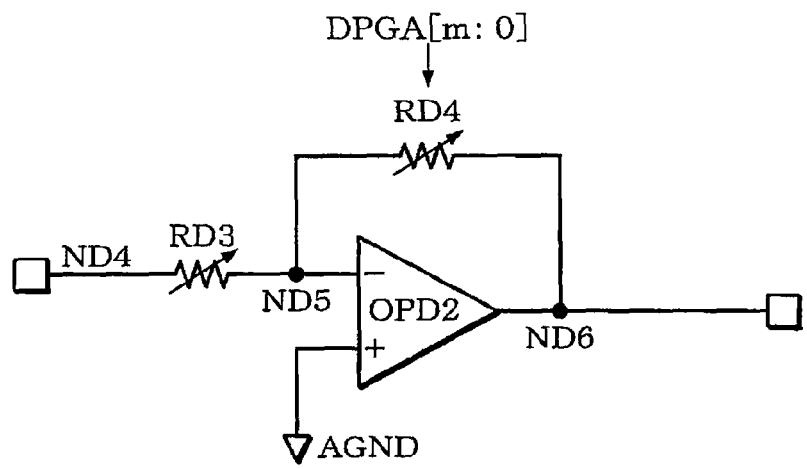

FIGS. 8A and 8B show configuration examples of the sensitivity adjustment circuit 80 (programmable-gain amplifier). FIG. 8A shows an example of a noninverting amplification type sensitivity adjustment circuit. The sensitivity adjustment circuit 80 shown in FIG. 8A includes variable resistors RD1 and RD2 provided between an output node ND3 and a node of the reference power supply voltage AGND (first power supply voltage in a broad sense). The sensitivity adjustment circuit 80 also includes an operational amplifier OPD1 of which the noninverting input terminal (+) is connected with an input node ND1 and the inverting input terminal (−) is connected with an output tap QT (node ND2) of the variable resistors RD1 and RD2.

In FIG. 8A, the resistance of the variable resistor RD2 between the output node ND3 and the output tap QT and the resistance of the variable resistor RD1 between the output tap QT and the node of the power supply voltage AGND are variably controlled based on sensitivity adjustment data DPGA[M:0]. This allows the gain of the sensitivity adjustment circuit 80 to be adjusted, whereby the sensitivity is adjusted.

For example, when the resistances of the resistors RD1 and RD2 are respectively R1 and R2, the gain of the sensitivity adjustment circuit 80 (PGA) is G=(R1+R2)/R1. The operational amplifier OPD1 amplifies the signal at the gain determined by the resistances (resistance ratio) of the variable resistors RD1 and RD2.

FIG. 8B shows an example of an inverting amplification type sensitivity adjustment circuit. The sensitivity adjustment circuit 80 shown in FIG. 8B includes a variable resistor RD3 provided between an input node ND4 and a node ND5, and a variable resistor RD4 provided between the node ND5 and an output node ND6. The sensitivity adjustment circuit 80 also includes an operational amplifier OPD2 of which the inverting input terminal is connected with the node ND5 and the noninverting input terminal is connected with a node of the power supply voltage AGND. In FIG. 8B, when the resistances of the variable resistors RD3 and RD4 are respectively R3 and R4, the gain of the sensitivity adjustment circuit 80 is G=−R4/R3.

Figure 9A:
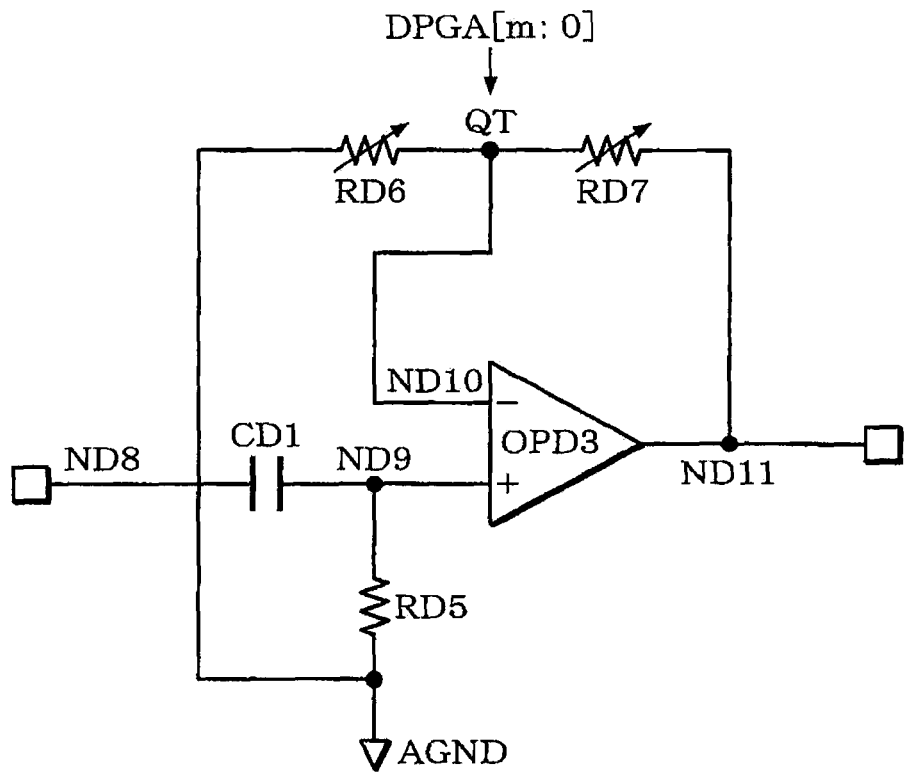
FIGS. 9A and 9B show further configuration examples of the sensitivity adjustment circuit.
Figure 9B:
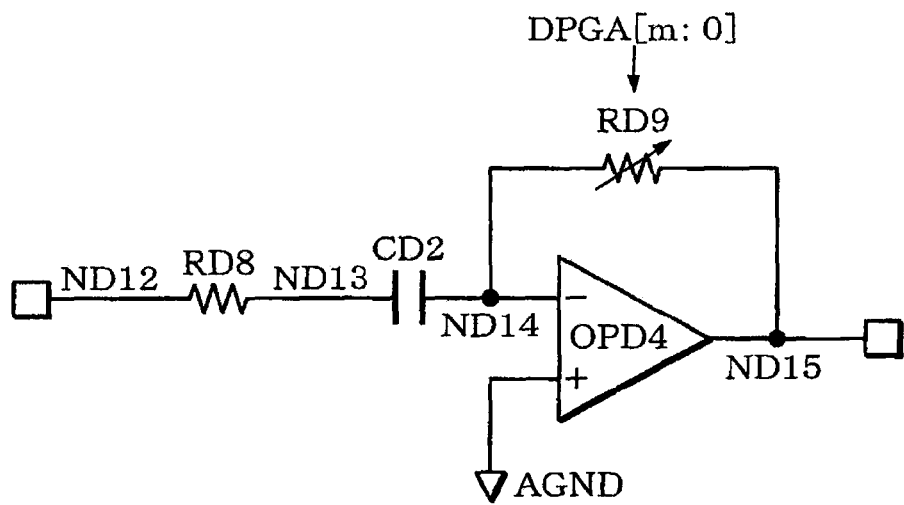

FIGS. 9A and 9B show further configuration examples of the sensitivity adjustment circuit 80. In FIGS. 9A and 9B, the sensitivity adjustment circuit 80 operates as a programmable-gain amplifier (PGA) and a high-pass filter. An operational amplifier is used in common by the high-pass filter (active filter) and the programmable-gain amplifier.

FIG. 9A shows an example of a noninverting amplification type sensitivity adjustment circuit. The sensitivity adjustment circuit 80 shown in FIG. 9A includes a capacitor CD1 provided between an input node ND8 and a node ND9 (first node), and a resistor RD5 provided between a node ND9 and a node of the power supply voltage AGND. The sensitivity adjustment circuit 80 also includes variable resistors RD6 and RD7 provided between an output node ND11 and the node of the power supply voltage AGND. The sensitivity adjustment circuit 80 also includes an operational amplifier OPD3 of which the noninverting input terminal is connected with the node ND9, the inverting input terminal is connected with an output tap QT (node ND10) of the variable resistors RD6 and RD7, and the output terminal is connected with the output node ND11.

In FIG. 9A, the resistance of the variable resistor RD7 between the output node ND11 and the output tap QT and the resistance of the variable resistor RD6 between the output tap QT and the node of the power supply voltage AGND are variably controlled based on the sensitivity adjustment data DPGA[M:0]. This allows adjustment of the gain of the sensitivity adjustment circuit 80, whereby the sensitivity is adjusted.

For example, when the resistances of the variable resistors RD6 and RD7 are respectively R6 and R7, the gain of the sensitivity adjustment circuit 80 (PGA) is G=(R6+R7)/R6. Specifically, the resistances R6 and R7 of the variable resistors RD6 and RD7 are determined by providing output taps for the variable resistors and selecting the output tap QT corresponding to the adjustment data DPGA[M:0] from the output taps, whereby the gain G=(R6+R7)/R6 is determined.

FIG. 9B shows an example of an inverting amplification type sensitivity adjustment circuit. The sensitivity adjustment circuit 80 shown in FIG. 9B includes a resistor RD8 provided between an input node ND12 and a node ND13 (first node), and a capacitor CD2 provided between the node ND13 and a node ND14 (second node). The sensitivity adjustment circuit 80 also includes a variable resistor RD9 which is provided between an output node ND15 and a node ND14 and of which the resistance is variably controlled based on the adjustment data DPGA[M:0]. The sensitivity adjustment circuit 80 also includes an operational amplifier OPD4 of which the inverting input terminal is connected with the node ND14 and the noninverting input terminal is connected with a node of the power supply voltage AGND.

In FIG. 9B, when the resistances of the variable resistors RD8 and RD9 are respectively R8 and R9, the gain of the sensitivity adjustment circuit 80 is G=−R9/R8. Note that modifications may be made such as changing the elements shown in FIGS. 9A and 9B or adding other elements.

The sensitivity is adjusted as follows using the sensitivity adjustment circuits 80 shown in FIGS. 8A to 9B. After manufacturing the gyrosensor, the output voltage VQ of the detection device 30 is monitored. The gyrosensor is rotated from a stationary state at a given rotation angular velocity, and the sensitivity is determined which is the amount of change in the output voltage VQ (slope of the straight line shown in FIG. 7) during rotation. The adjustment data DPGA[M:0] for causing the determined sensitivity to coincide with the reference sensitivity is written into a nonvolatile memory (not shown) or the like. The sensitivity adjustment circuit 80 adjusts the gain of the operational amplifier based on the adjustment data DPGA[M:0] so that the sensitivity of the detection device 30 coincides with the reference sensitivity.

Figure 10:
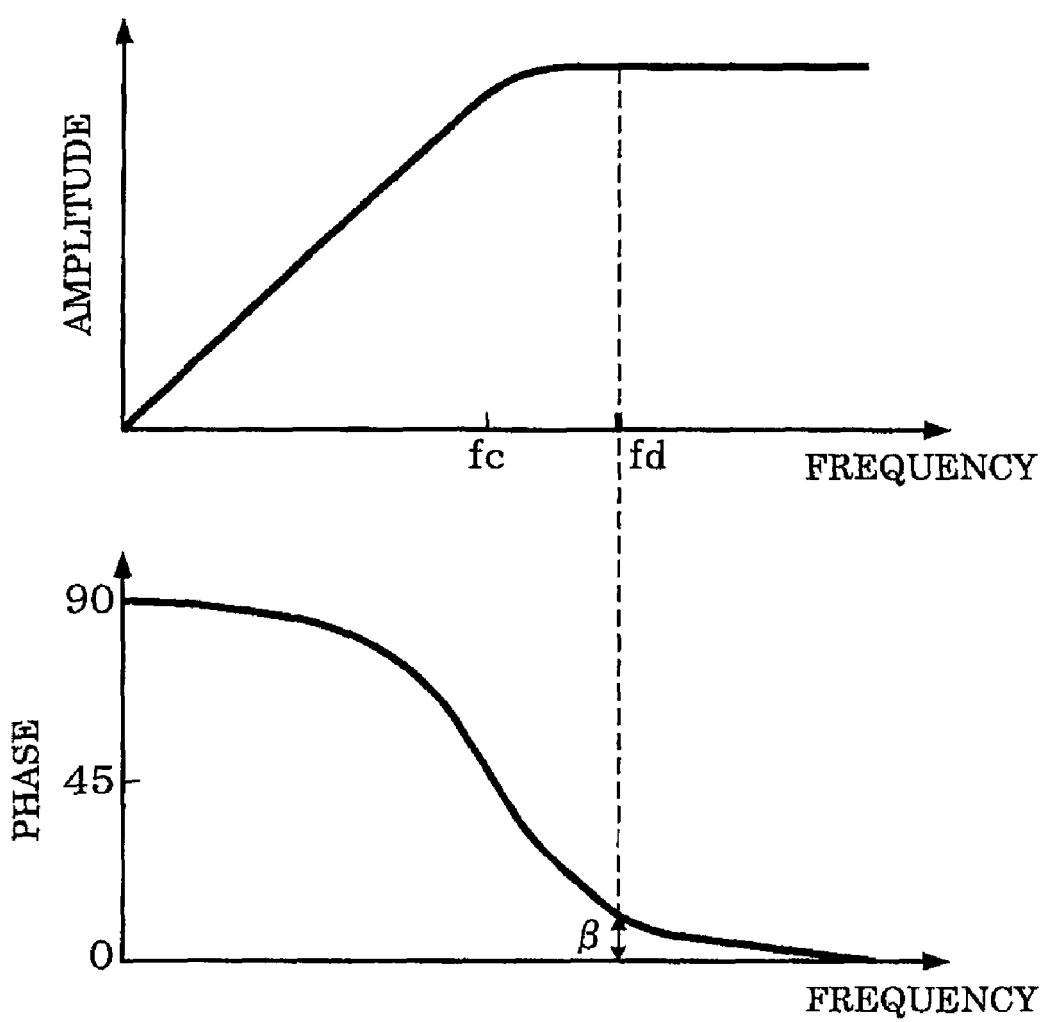
FIG. 10 shows frequency characteristics of a high-pass filter.

The sensitivity adjustment circuits 80 shown in FIGS. 9A and 9B operate as a programmable-gain amplifier and a high-pass filter having filtering characteristics (frequency characteristics or phase characteristics) shown in FIG. 10, for example. In FIG. 9A, the capacitor CD1, the resistor RD5, and the operational amplifier OPD3 make up a high-pass active filter. Specifically, the operational amplifier OPD3 functions as a buffer for the high-pass filter formed of the capacitor CD1 and the resistor RD5. A programmable-gain amplifier is formed of the variable resistors RD6 and RD7 and the operational amplifier OPD3. Specifically, the operational amplifier OPD3 is used in common by the high-pass active filter and the programmable-gain amplifier in FIG. 9A.

In FIG. 9B, the resistor RD8, the capacitor CD2, the resistor RD9, and the operational amplifier OPD4 make up a high-pass active filter. A programmable-gain amplifier is formed of the resistor RD8, the variable resistor RD9, and the operational amplifier OPD4. In FIG. 9B, the operational amplifier OPD4 is used in common by the high-pass active filter and the programmable-gain amplifier.

The DC component can be cut off by causing the sensitivity adjustment circuit 80 to operate as the high-pass filter shown in FIG. 10, whereby a situation can be prevented in which the DC signal is amplified by the programmable-gain amplifier (PGA). Therefore, a problem can be prevented in which the programmable-gain amplifier of the sensitivity adjustment circuit 80 or the operational amplifier in the subsequent stage (e.g. operational amplifier of the offset adjustment circuit or the synchronous detection circuit) is saturated due to overinput, whereby the output overflows. Moreover, DC noise can be removed by the high-pass filter, whereby the S/N ratio can be increased.

In FIGS. 9A and 9B, the operational amplifier is used in common by the high-pass active filter and the programmable-gain amplifier. Therefore, the number of operational amplifiers can be reduced in comparison with the case of separately providing an operational amplifier for the active filter and an operational amplifier for the programmable-gain amplifier. As a result, the circuit scale can be reduced. Moreover, since the number of circuit blocks as the noise source can be reduced, the S/N ratio can be increased.

The circuit shown in FIG. 9A has an advantage over the circuit shown in FIG. 9B in that the cut-off frequency and the gain (resistance of the variable resistor) can be independently controlled. In the high-pass filter shown in FIG. 10, it is desirable to decrease the cut-off frequency fc as much as possible in order to cut off the DC components and allow the desired signal to pass through, for example. When the capacitance is C and the resistance is R, the cut-off frequency is indicated by fc=1/2πCR. Since the area of the circuit is increased when increasing the capacitance C2 of the capacitor CD2 shown in FIG. 9B, it is necessary to increase the resistance R8 of the resistor RD8 in order to decrease the cut-off frequency fc.

However, noise (e.g. thermal noise) generated by the resistor RD8 is increased when increasing the resistance R8, whereby the S/N ratio is decreased. For example, the gain of the programmable-gain amplifier shown in FIG. 9B is G=−R9/R8. Therefore, it is necessary to increase the resistance R9 when increasing the resistance R8. Therefore, noise generated by the variable resistor RD9 is also increased, whereby the S/N ratio is decreased.

In FIG. 9A, the cut-off frequency fc is determined by the capacitance C1 of the capacitor CD1 and the resistance R5 of the resistor RD5. On the other hand, the gain G=(R6+R7)/R6 of the programmable-gain amplifier is determined by the resistances R6 and R7 of the variable resistors RD6 and RD7. Specifically, the cut-off frequency fc and the gain can be separately adjusted. Therefore, even if the resistance R5 of the resistor RD5 is increased in order to decrease the cut-off frequency fc, it is unnecessary to increase the resistances R6 and R7 of the variable resistors RD6 and RD7. As a result, since the resistances R6 and R7 of the variable resistors RD6 and RD7 can be sufficiently reduced in comparison with the resistance R9 of the resistor RD9 shown in FIG. 9B, noise generated by the variable resistors RD6 and RD7 can be reduced, whereby the S/N ratio can be increased. In the circuit shown in FIG. 9B, the node ND14 is set at the potential of the power supply voltage AGND due to a virtual short circuit. Therefore, the input voltage range of the operational amplifier OPD4 can be increased in comparison with the circuit shown in FIG. 9A, whereby the design of the dynamic range of the operational amplifier can be simplified.

6. Offset Adjustment

Figure 11A:
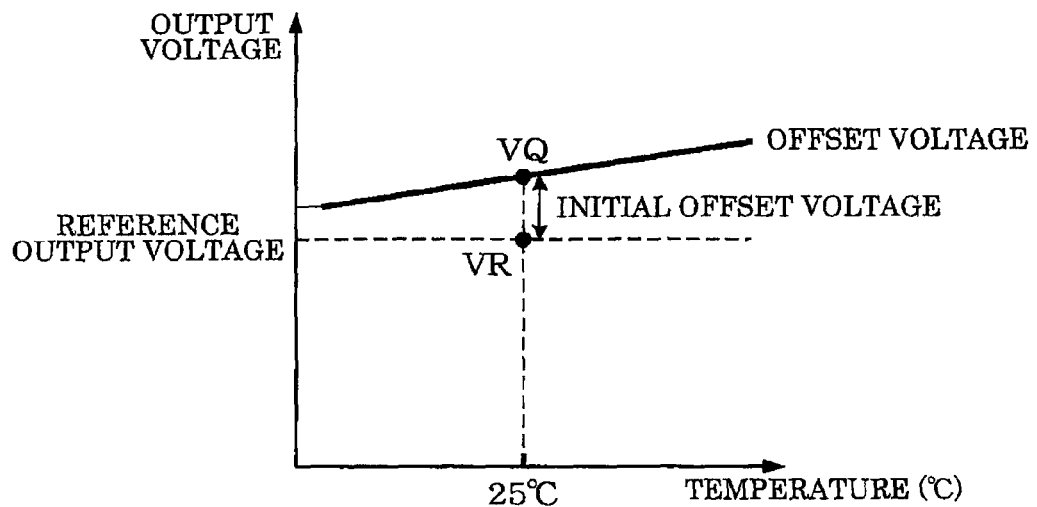
FIGS. 11A and 11B are views illustrative of offset adjustment.
Figure 11B:
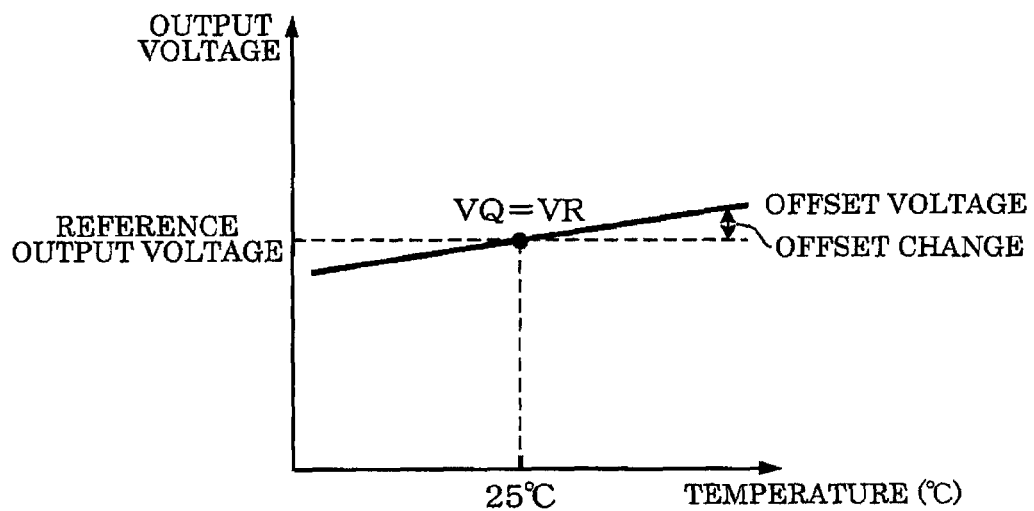

The offset adjustment circuit 90 shown in FIG. 2 performs offset adjustment so that the output voltage of the detection device 30 (voltage of the output signal VSQ) coincides with the reference output voltage (e.g. VDD/2) when the ambient temperature is 25° C. (typical temperature), for example. In FIG. 11A, the output voltage VQ does not coincide with the reference output voltage VR, for example. In this case, the offset adjustment circuit 90 performs offset adjustment so that the initial offset voltage |VQ−VR| is removed and becomes zero, as shown in FIG. 11B. Specifically, the output voltage VQ of the detection device 30 is monitored after manufacturing the gyrosensor. Initial offset adjustment data for causing the output voltage VQ to coincide with the reference output voltage VR is written into a nonvolatile memory (not shown) or the like. The offset adjustment circuit 90 performs offset adjustment based on the adjustment data so that the output voltage VQ of the detection device 30 coincides with the reference output voltage VR.

This allows the output voltage (zero-point voltage) VQ of the detection device 30 to coincide with the reference output voltage VR at least when the ambient temperature is 25° C. and the angular velocity of the gyrosensor is zero (stationary state).

However, the offset voltage has positive or negative temperature characteristics (temperature drift), as shown in FIG. 11B. Therefore, even if the initial offset voltage is removed (zero), the offset change due to a change in temperature (change in environment in a broad sense) does not become zero.

For example, even if the initial offset voltage is removed, the offset changes due to DC offset and mechanical vibration leakage shown in FIG. 5A appear in the fd and 2fd frequency bands after synchronous detection. Moreover, when the phase shift described with reference to FIGS. 6C and 6D changes due to a change in temperature, the offset change in the unnecessary signal due to the phase shift appears in the DC frequency band. This causes the sensitivity adjusted by the sensitivity adjustment circuit 80 before shipment to have a component which changes due to a change in temperature. This embodiment employs the following method in order to solve the above problem.

Figure 12:
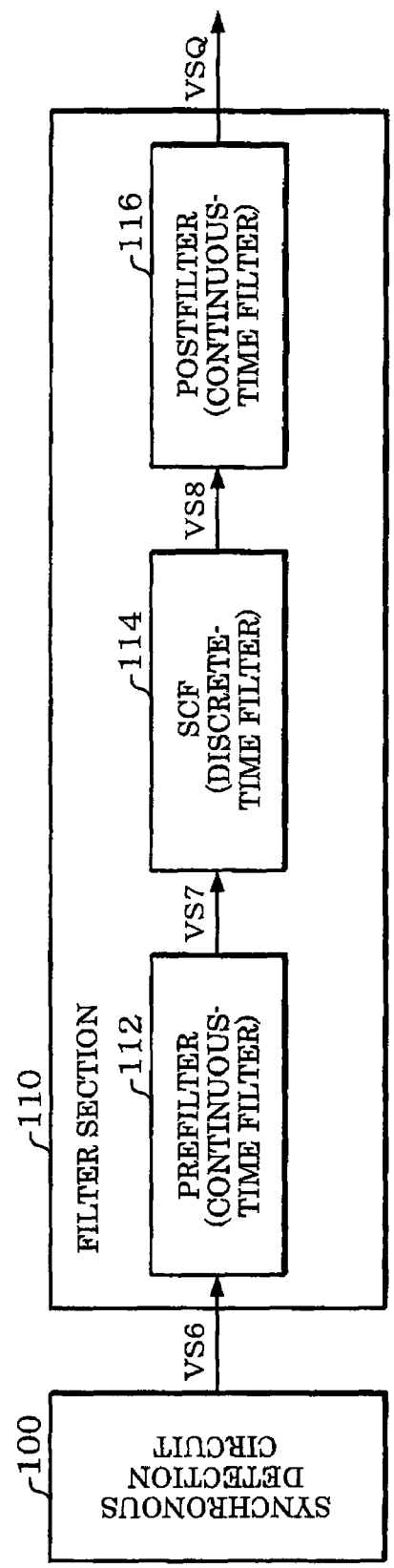
FIG. 12 shows a configuration example of a filter section.

FIG. 12 shows a configuration example of the filter section 110 according to this embodiment. The filter section 110 includes a switched-capacitor filter (SCF) 114 which is a discrete-time filter. The filter section 110 also includes a prefilter 112 provided in the preceding stage of the SCF 114 (discrete-time filter in a broad sense), and a postfilter 116 provided in the subsequent stage of the SCF 114. The prefilter 112 and the postfilter 116 are continuous-time filters.

In this embodiment, the prefilter 112 (continuous-time filter in a broad sense) has frequency characteristics of removing the offset change in the unnecessary signal due to a change in environment such as a change in temperature or a change in voltage.

Specifically, when providing the SCF 114 in the filter section 110, as shown in FIG. 12, since the SCF 114 samples the signal in discrete time, aliasing occurs which is a frequency fold-over phenomenon caused by sampling. For example, when the sampling frequency is fsp, a signal having a harmonic frequency of fsp/2 (=fd/2) folds over into the DC frequency region or the like, whereby the S/N ratio deteriorates.

In FIG. 12, the anti-aliasing prefilter 112 is provided in the preceding stage of the SCF 114 in order to prevent the adverse effects of aliasing. Specifically, when the sampling frequency is fsp (=fd), the prefilter 112 has anti-aliasing frequency characteristics of removing frequency components equal to or higher than the frequency fsp/2 (=fd/2).

This embodiment focuses on the anti-aliasing prefilter 112 and effectively utilizes the prefilter 112. Specifically, the anti-aliasing prefilter 112 is also used as a filter which removes the offset change in the unnecessary signal due to a change in environment. This makes it unnecessary to separately provide a filter which removes the offset change in the unnecessary signal. Therefore, the circuit scale can be reduced. Moreover, since the number of circuit blocks as the noise source can be reduced, the S/N ratio can be increased.

FIGS. 13A to 13C show examples of frequency spectra after removing the initial offset voltage as shown in FIG. 11B. When the offset voltage has positive or negative temperature characteristics, as shown in FIG. 11B, the offset change in the unnecessary signal due to DC offset appears in the DC frequency band, as shown in FIG. 13A, even if the initial offset voltage is removed. Moreover, the offset change in the unnecessary signal due to mechanical vibration leakage appears in the fd frequency band.

As shown in FIG. 13B, the offset change in the unnecessary signal due to DC offset appears in the fd frequency band and the offset change in the unnecessary signal due to mechanical vibration leakage appears in the 2fd frequency band after synchronous detection.

Specifically, when the ambient temperature is 25° C., the components of the unnecessary signals in the DC and fd frequency bands shown in FIG. 13A are removed by offset adjustment using the offset adjustment circuit 90.

However, when the ambient temperature is higher or lower than 25° C., the offset changes in the unnecessary signals due to the change in temperature appear in the DC and fd frequency bands. For example, when the amplitude of the unnecessary signal due to mechanical vibration leakage is increased due to a change in temperature, the increase in amplitude appears in the fd frequency band before synchronous detection and appears in the 2fd frequency band after synchronous detection. Since the above offset change in the unnecessary signal cannot be removed by the adjustment step after manufacturing the gyrosensor, it is necessary to remove the offset change by dynamic offset adjustment during the operation of the gyrosensor.

Moreover, when the offset change appears in the DC frequency band after synchronous detection or folds over into the DC frequency band due to discrete sampling of the SCF 114, the sensitivity adjusted by the sensitivity adjustment circuit 80 also varies. Specifically, the offset change appears as a change in sensitivity due to a change in temperature.

In this case, a method may be considered in which a special temperature compensation circuit for removing the offset change is provided in the detection device 30.

However, this method results in an increase in circuit scale due to incorporation of the temperature compensation circuit. Moreover, since the number of circuit blocks as the noise source is increased, the S/N ratio deteriorates.

In this embodiment, the offset changes in the unnecessary signals are removed, as shown in FIG. 13C, by effectively utilizing the prefilter 112 necessary for anti-aliasing. Therefore, the circuit scale can be reduced. Moreover, since the number of circuit blocks as the noise source can be reduced, the S/N ratio can be increased.

Specifically, a normal anti-aliasing prefilter has the following role (A1).

(A1) To prevent an unnecessary signal such as random noise or pulse noise generated in the circuit from folding over into the pass band of the SCF.

On the other hand, this embodiment assigns the following role (A2) to the prefilter 112 in addition to the role (A1).

(A2) To prevent the offset change in the unnecessary signal, which is caused by synchronous detection and necessarily exists at the frequency k×fd such as the frequencies fd and 2fd, from folding over into the DC frequency band due to sampling of the SCF 114 to cause the quality (S/N ratio) of the desired signal (Coriolis force signal) which exists in the DC frequency band to deteriorate.

The role (A2) arises from the following reasons (B1) to (B3) specific to the gyrosensor.

(B1) The gyrosensor performs synchronous detection.

(B2) A strong spectrum of the offset change in the unnecessary signal appears at the frequency fd or 2fd due to synchronous detection.

(B3) Since the sampling frequency of the SCF is fsp=fd, the offset change in the unnecessary signal in the fd or 2fd frequency band folds over into the DC frequency band in which the desired signal exists.

Specifically, the offset change in the unnecessary signal which appears in the fd or 2fd frequency band after synchronous detection (see FIG. 13B) is greater than the amplitude of the desired signal.

In order to simplify the system configuration, it is desirable to set the sampling frequency of the SCF 114 at fsp=fd, as described later. When the sampling frequency is set at fsp=fd, the offset change in the unnecessary signal which appears in the fd or 2fd frequency band folds over exactly into the DC frequency band.

On the other hand, the desired signal which exists in the fd frequency band before synchronous detection (see FIG. 13A) appears in the DC frequency band after synchronous detection (see FIG. 13B). Therefore, if no measure is taken, the quality of the desired signal in the DC frequency band significantly deteriorates when the offset change in the unnecessary signal in the fd or 2fd frequency band folds over. In more detail, when the offset change in the unnecessary signal in the fd or 2fd frequency band folds over and the offset change greater than the minimum resolution of the desired signal is superimposed on the DC frequency band, false information indicating that the gyrosensor rotates at a specific angular velocity is provided even if the gyrosensor is in a stationary state.

In order to solve the above problem, this embodiment focuses on the prefilter 112 provided in the preceding stage of the SCF 114 and assigns the above role (A2) to the prefilter 112 in addition to the role (A1).

7. Frequency Characteristics of Continuous-Time Filter

In a sensor which handles a weak signal such as a gyrosensor, the amplitude of the unnecessary signal is significantly greater than the amplitude of the desired signal. Therefore, when the amplitude of the unnecessary signal due to mechanical vibration leakage or the like is changed due to a change in temperature, the offset change which is a change in the amplitude of the unnecessary signal becomes significantly greater than the amplitude of the desired signal (DC component). Therefore, if the attenuation of the prefilter 112 is not appropriately set, the offset change may fold over into the DC component due to sampling of the SCF 114, thereby causing the S/N ratio to deteriorate.

In this embodiment, the prefilter 112 (continuous-time filter) has frequency characteristics (filtering characteristics or attenuation characteristics) of attenuating the offset change in the unnecessary signal, which appears in the frequency band of the frequency k×fd (k is a positive integer) due to synchronous detection by the synchronous detection circuit 100, to a value equal to or smaller than the amplitude of the desired signal (minimum resolution). For example, the prefilter 112 has frequency characteristics of attenuating the offset change in the unnecessary signal which appears in the fd, 2fd, or 3fd frequency band (see FIG. 13B) to a value equal to or smaller than the amplitude of the desired signal. The amplitude of the desired signal corresponds to the minimum resolution of the desired signal, and corresponds to the degree per second (dps). The amplitude of the desired signal is the amplitude of the desired signal in the DC frequency region.

Therefore, even if the offset change (change in amplitude of unnecessary signal) significantly greater than the desired signal appears at the frequency k×fd, the offset change can be reliably removed using the prefilter 112. Therefore, a situation can be prevented in which the offset change folds over into the DC component due to sampling of the SCF 114 to cause the S/N ratio to deteriorate. This makes it possible to provide a detection device optimum for a gyrosensor which handles a weak signal.

Figure 14:
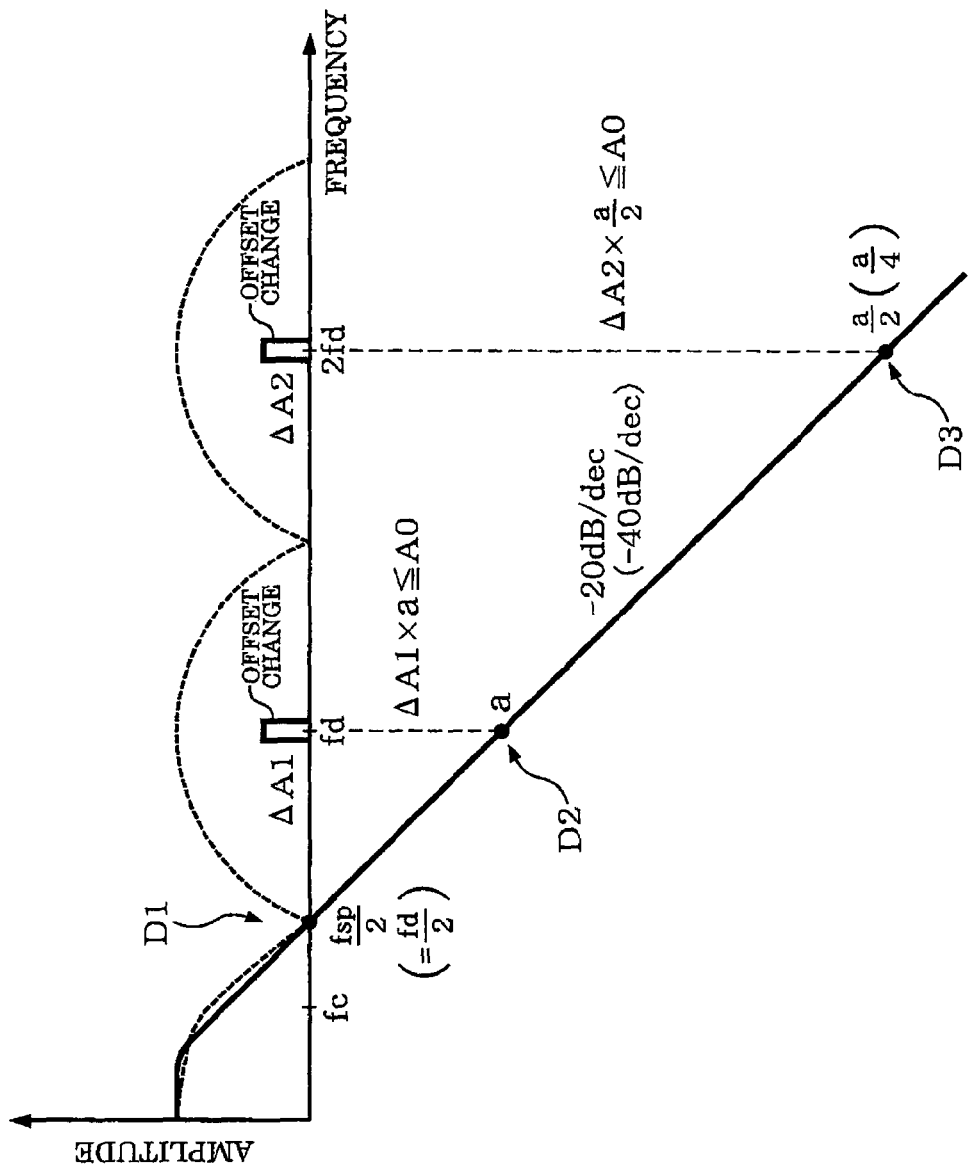
FIG. 14 is a view illustrative of frequency characteristics of a prefilter.

FIG. 14 schematically shows the frequency characteristics of the prefilter 112. As indicated by D1 in FIG. 14, the prefilter 112 has sufficient attenuation characteristics at the frequency fsp/2 (=fd/2). Therefore, a situation can be prevented in which random noise (e.g. thermal noise and 1/f noise) folds over due to sampling of the SCF 114 to cause the S/N ratio to deteriorate, whereby the prefilter 112 can serve as a normal anti-aliasing filter.

When the prefilter 112 is a first-order low-pass filter, the attenuation slope is −20 dB/dec. The amplitude (minimum resolution) of the desired signal (DC component) is indicated by A0, the offset change in the unnecessary signal which appears at the frequency k×fd (k is a positive integer) is indicated by ΔAk, and the attenuation factor of the filter at the frequency fd is indicated by a. In this case, the prefilter 112 may have frequency characteristics of attenuating the offset change in the unnecessary signal so that ΔAk×(a/k)≦A0 is satisfied.

At D2 in FIG. 14, the offset change in the unnecessary signal which appears at the frequency fd is ΔA1, and the attenuation factor (attenuation) of the filter at the frequency fd is a. Therefore, the frequency characteristics are adjusted so that ΔA1×a≦A0 is satisfied.

At D3 in FIG. 14, the offset change in the unnecessary signal which appears at the frequency 2fd is ΔA2, and the attenuation factor of the filter at the frequency 2fd is a/k=a/2 since the prefilter 112 is a first-order filter. Therefore, the frequency characteristics are adjusted so that ΔA2×(a/2)≦A0 is satisfied.

Although not shown in FIG. 14, the offset change in the unnecessary signal which appears at the frequency 3fd is ΔA3, and the attenuation factor of the filter at the frequency 3fd is a/k=a/3 since the prefilter 112 is a first-order filter. Therefore, the frequency characteristics are adjusted so that ΔA3×(a/3)≦A0 is satisfied.

If the above conditions are satisfied, the offset change in the unnecessary signal which appears in the fd, 2fd, or 3fd frequency band can be attenuated to a value equal to or smaller than the amplitude of the desired signal when the prefilter 112 is a first-order low-pass filter.

A second-order low-pass filter may be used as the prefilter 112. When the prefilter 112 is a second-order low-pass filter, the attenuation slope is −40 dB/dec. In this case, the prefilter 112 may have frequency characteristics of attenuating the offset change in the unnecessary signal so that ΔAk×(a/k$^2$)≦A0 is satisfied.

For example, since the offset change in the unnecessary signal which appears at the frequency fd is ΔA1, and the attenuation factor of the filter at the frequency fd is a, the frequency characteristics are adjusted so that ΔA1×a≦A0 is satisfied.

The offset change in the unnecessary signal which appears at the frequency 2fd is ΔA2, and the attenuation factor of the filter at the frequency 2fd is a/k$^2$=a/4 since the prefilter 112 is a second-order filter. Therefore, the frequency characteristics are adjusted so that ΔA2×(a/4)≦A0 is satisfied.

The offset change in the unnecessary signal which appears at the frequency 3fd is ΔA3, and the attenuation factor of the filter at the frequency 3fd is a/k$^2$=a/9 since the prefilter 112 is a second-order filter. Therefore, the frequency characteristics are adjusted so that ΔA3×(a/9)≦A0 is satisfied.

If the above conditions are satisfied, the offset change in the unnecessary signal which appears in the fd, 2fd, or 3fd frequency band can be attenuated to a value equal to or smaller than the amplitude of the desired signal when the prefilter 112 is a second-order low-pass filter.

Figure 15A:
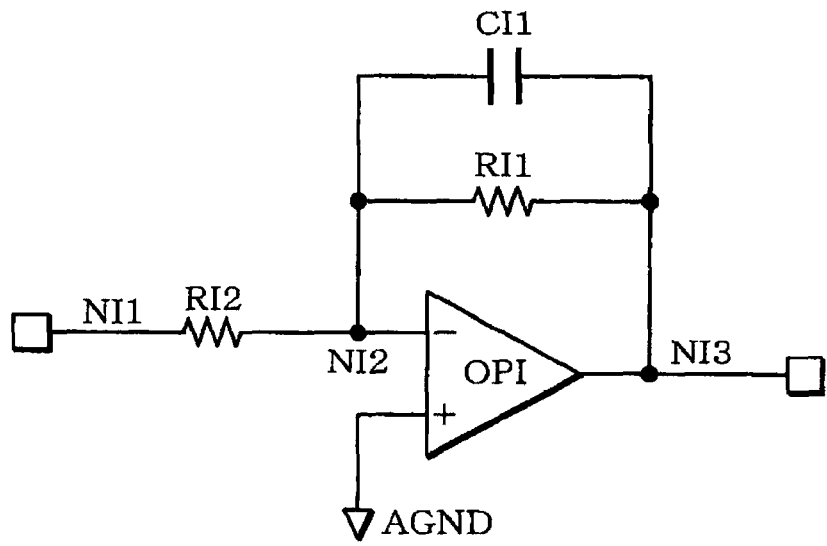
FIGS. 15A and 15B show configuration examples of the prefilter.

FIG. 15A shows a configuration example of the prefilter 112. FIG. 15A shows an example of a first-order low-pass filter. The prefilter 112 includes a resistor RI1 and a capacitor CI1 provided between nodes NI2 and NI3, and a resistor R12 provided between nodes NI1 and NI2. The prefilter 112 also includes an operational amplifier OPI of which the inverting input terminal is connected with the node NI2 and the non-inverting input terminal is connected with a node of the power supply voltage AGND. The circuit shown in FIG. 15A may also be used as the postfilter 116 shown in FIG. 12.

Figure 15B:
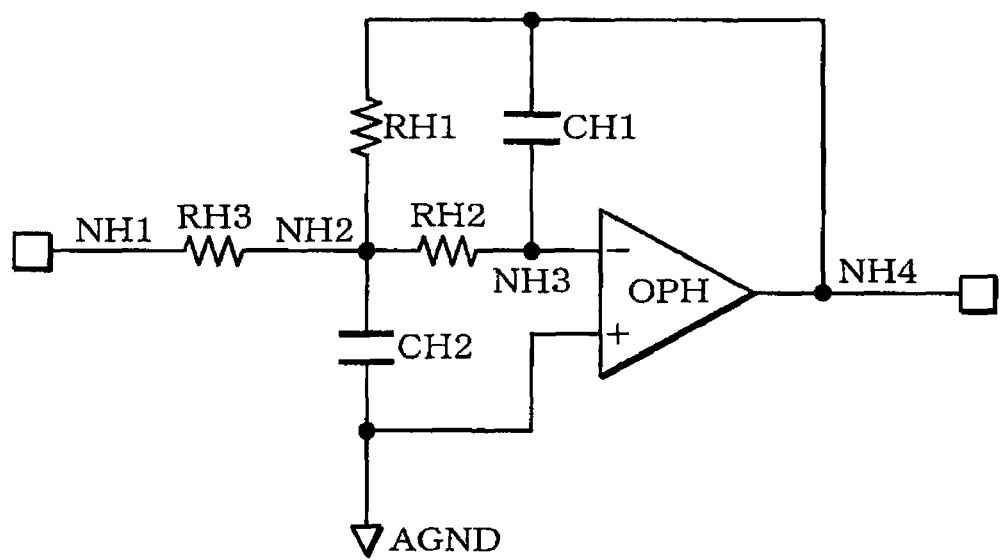

A second-order low-pass filter may be used as the prefilter 112. FIG. 15B shows an example of a second-order low-pass filter. The low-pass filter shown in FIG. 15B includes resistors RH1, RH2, and RH3 respectively provided between a node NH2 and nodes NH4, NH3, and NH1, a capacitor CH1 provided between the nodes NH3 and NH4, and a capacitor CH2 provided between the node NH2 and a node of the power supply voltage AGND. The low-pass filter also includes an operational amplifier OPH of which the inverting input terminal is connected with the node NH3 and the noninverting input terminal is connected with the node of the power supply voltage AGND.

Figure 16:
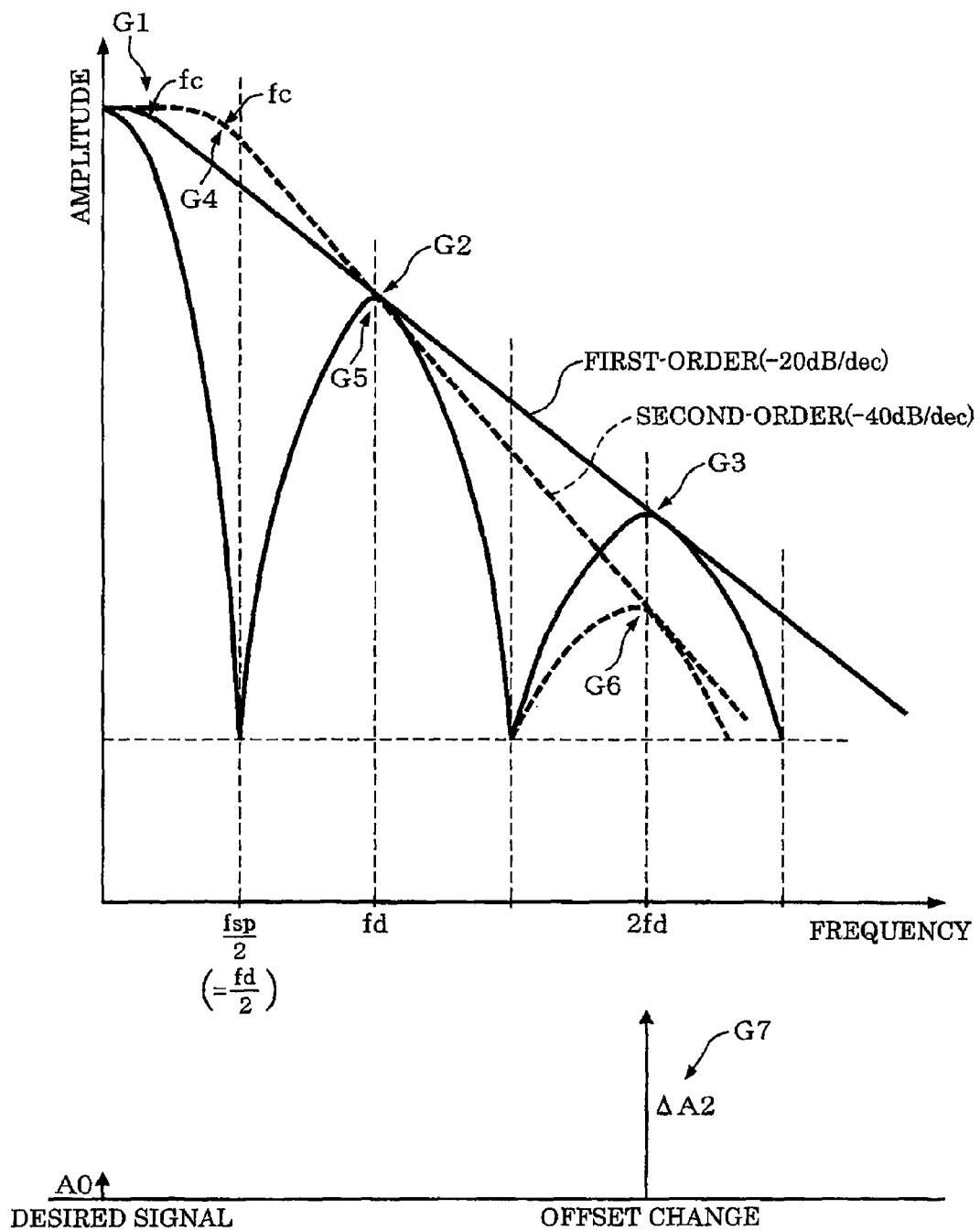
FIG. 16 is a view illustrative of frequency characteristics when using first-order and second-order prefilters.

When the capacitance of the capacitor CI1 is C1 and the resistance of the resistor RI1 is R1, the cut-off frequency of the first-order low-pass filter shown in FIG. 15A is fc=1/(2π× C1×R1). The attenuation slope is −20 dB/dec. Therefore, when using the first-order low-pass filter, the attenuations at the frequencies fd and 2fd can be reduced, as indicated by G2 and G3 in FIG. 16, by sufficiently decreasing the cut-off frequency fc, as indicated by G1. As a result, the offset change in the unnecessary signal indicated by G7 can also be attenuated, whereby the offset change can be attenuated to a value equal to or smaller than the minimum resolution of the desired signal, even if the offset change folds over into the DC frequency band.

When the capacitances of the capacitors CH1 and CH2 are respectively C1 and C2 and the resistances of the resistors RH1 and RH2 are respectively R1 and R2, the cut-off frequency of the second-order low-pass filter shown in FIG. 15B is fc=1/{2π×(C1×C2×R1×R2)$^{1/2}$}. The attenuation slope is −40 dB/dec. The second-order low-pass filter has a large attenuation slope although the number of elements is increased. Therefore, sufficient attenuations can be obtained at the frequencies fd and 2fd, as indicated by G5 and G6 in FIG. 16, even if the cut-off frequency fc is decreased to a large extent, as indicated by G4. Therefore, the circuit scale can be reduced in comparison with the case of using the first-order low-pass filter shown in FIG. 15A. Moreover, the offset change in the unnecessary signal can be sufficiently attenuated, whereby the offset change can be reliably removed.

8. Detuning Frequency

An unnecessary signal caused by the detuning frequency (offset frequency) Δf=|fd−fs| occurs when a signal having the detection-side resonance frequency fs is mixed into the sensor signal and the resulting sensor signal is synchronously detected by the synchronous detection circuit 100. For example, the detection vibrator may be allowed to vibrate (idle) with a small amplitude at the natural resonance frequency fs in order to improve the response of the gyrosensor. Or, the detection vibrator may vibrate at the natural resonance frequency fs when external vibration from the outside of the gyrosensor is applied to the vibrator. When the detection vibrator vibrates at the frequency fs, a signal having the frequency fs is mixed into the signal VS5 input to the synchronous detection circuit 100. Since the synchronous detection circuit 100 performs synchronous detection based on the reference signal RS having the frequency fd, an unnecessary signal having the detuning frequency $\Delta f=|fd-fs|$ corresponding to the difference between the frequencies fd and fs is generated.

For example, the signal having the frequency fs to be mixed may be indicated by $D \sin(\omega s \times t)$. Note that $\omega s = 2\pi fs$. Since synchronous detection is considered to be multiplication of the sensor signal and the driving signal (reference signal), the signal having the frequency fs contained in the sensor signal is indicated by $C \sin(\omega d \times t) \times D \sin(\omega s \times t) = \{-(D \times C)/2\} \times [\cos\{(\omega d+\omega s)t\} - \cos\{(\omega d-\omega s)t\}]$. As is clear from the above expression, an unnecessary signal having the detuning frequency $\Delta f=|fd-fs|$ is generated after synchronous detection when the signal having the frequency fs is mixed.

Figure 17:
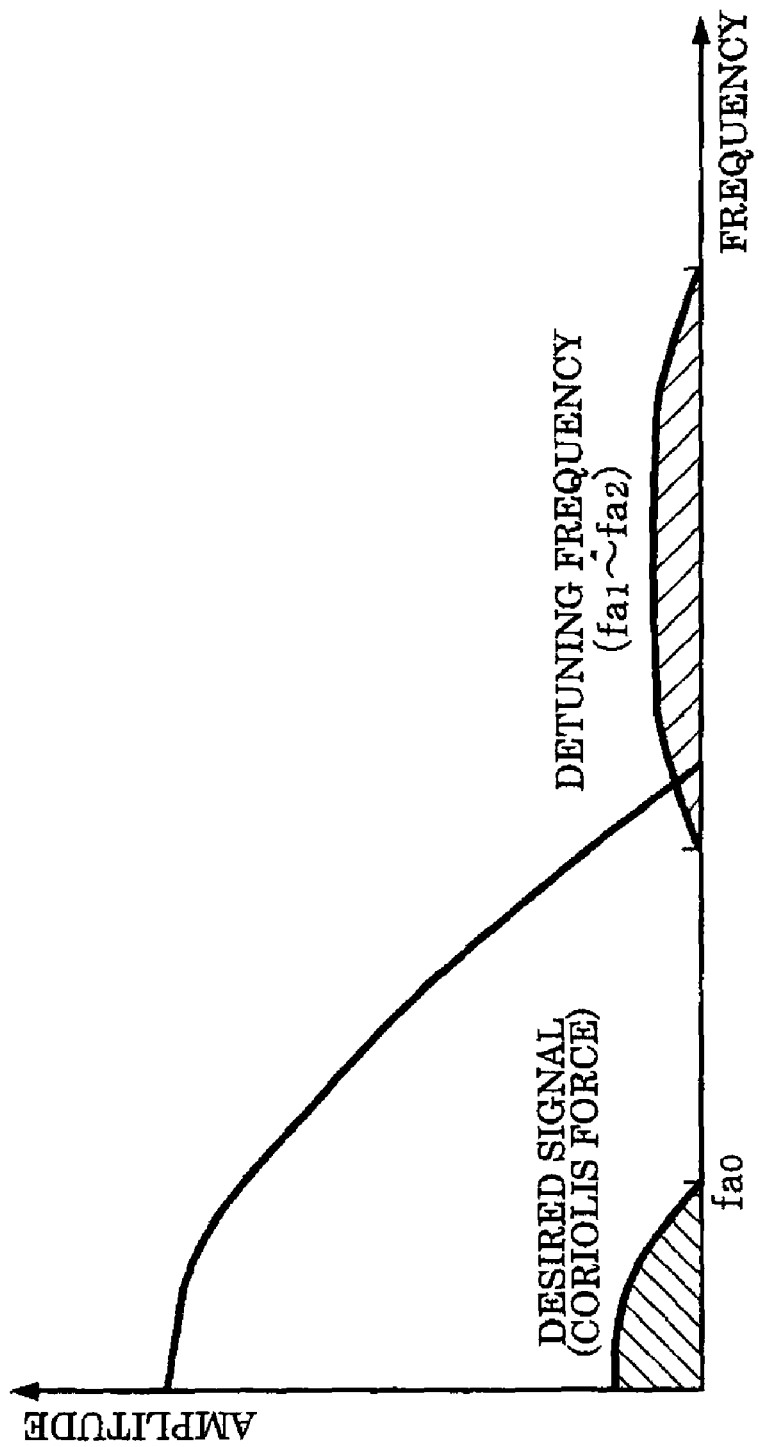
FIG. 17 is a view illustrative of a detuning frequency.

The detuning frequency $\Delta f=|fd-fs|$ which is sufficiently lower than the frequencies fd and fs. Therefore, steep attenuation characteristics shown in FIG. 17 are necessary to remove the unnecessary signal of the component having the detuning frequency $\Delta f$. Therefore, it is difficult to remove the unnecessary signal of the component having the detuning frequency $\Delta f$ using only a normal continuous-time low-pass filter.

In order to solve the above problem, the SCF 114 (discrete-time filter) is provided in the filter section 110 in FIG. 12. The SCF 114 has frequency characteristics of removing the component having the detuning frequency $\Delta f=|fd-fs|$ corresponding to the difference between the driving-side resonance frequency fd and the detection-side resonance frequency fs of the vibrator and allowing the frequency component (DC component) of the desired signal to pass through.

The steep attenuation characteristics shown in FIG. 17 are easily realized by providing the SCF 114 (discrete-time filter in a broad sense) in the filter section 110, as shown in FIG. 12. Therefore, even if the detuning frequency $\Delta f$ is extremely lower than the frequency fd, the component of the unnecessary signal in the frequency band of the detuning frequency $\Delta f$ can be reliably and easily removed without adversely affecting the desired signal in the pass band.

The continuous-time filter has a disadvantage in that the frequency characteristics of the filter vary if the capacitance C of the capacitor and the resistance R of the resistor forming the filter vary, whereby it is difficult to obtain stable frequency characteristics. For example, the absolute values of the capacitance C and the resistance R vary in the range of about ±20%. Since the cut-off frequency of the continuous-time filter (RC filter) is determined by C×R, the cut-off frequency varies to a large extent. If the cut-off frequency varies, the amplitude of the desired signal in the pass band is attenuated or the phase is changed, whereby the signal quality deteriorates.

On the other hand, the filtering characteristics of the SCF 114 can be determined by the capacitance ratio and the sampling frequency (clock frequency). For example, since the accuracy of the capacitance ratio is 0.1% or less, the cut-off frequency varies to only a small extent. Therefore, steep attenuation characteristics of reliably removing the unnecessary signal having the detuning frequency $\Delta f$ while allowing the desired signal in the pass band to pass through can be easily realized using the SCF 114.

As a comparative example of this embodiment, a method may be considered in which a band-pass filter is provided in the preceding stage of the synchronous detection circuit, a signal having the frequency fd is allowed to pass through the band-pass filter, and a signal having the frequency fs is removed by the band-pass filter.

However, the method of the comparative example makes it necessary to set the Q value of the band-pass filter at a large value of 50 or more, for example. Therefore, it is necessary to strictly manage the capacitance ratio when realizing the band-pass filter using an SCF, whereby yield and the like are decreased. The same attenuation is obtained by using an n-order low-pass filter or a 2×n-order band-pass filter. Therefore, the number of elements of the SCF band-pass filter is increased in comparison with the SCF low-pass filter, whereby the circuit area is increased.

On the other hand, since the SCF 114 as the low-pass filter is provided in this embodiment, management of the capacitance ratio can be facilitated and the circuit area can be reduced in comparison with the case of using a band-pass filter.

Figure 18:
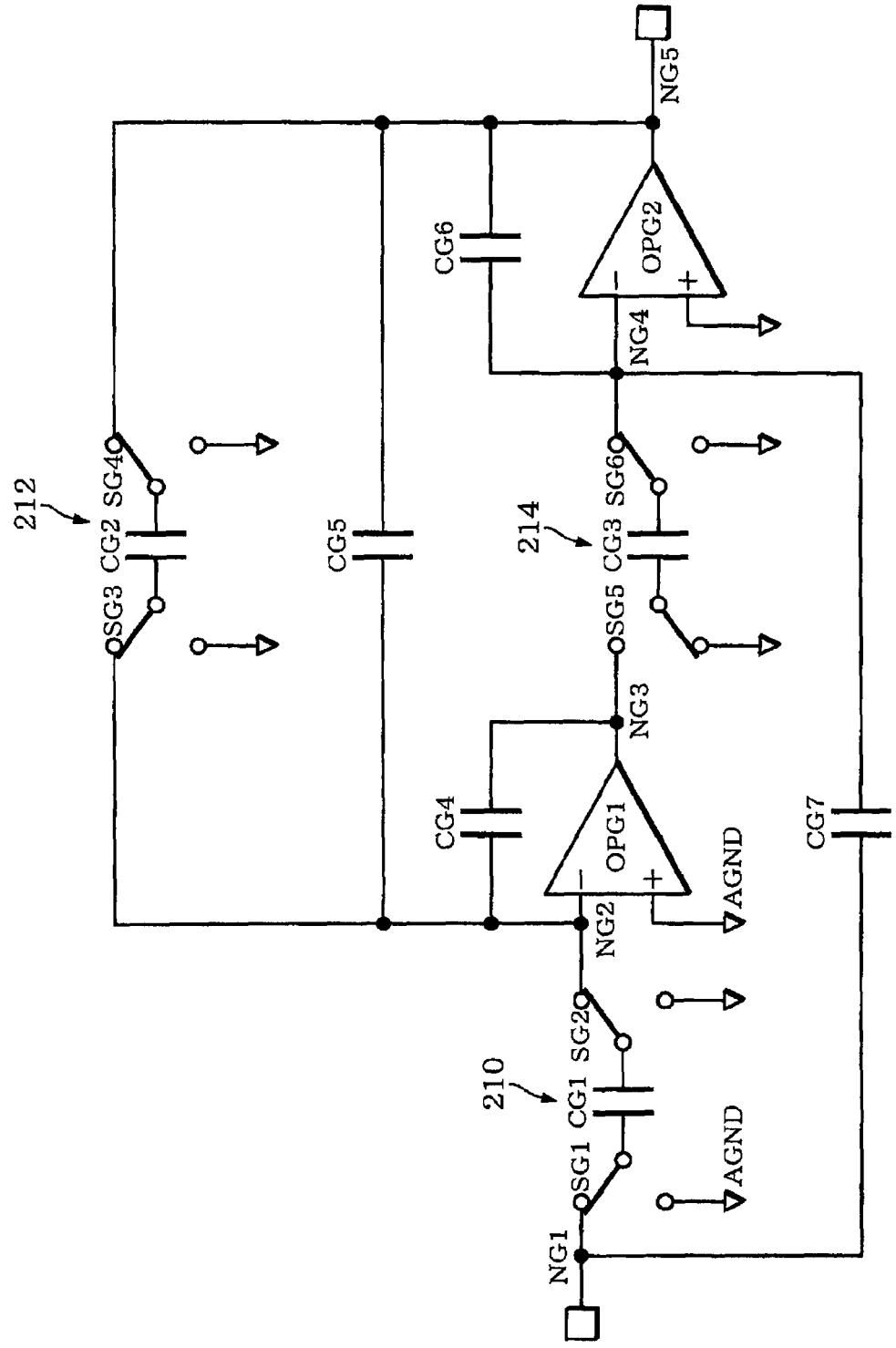
FIG. 18 shows a configuration example of an SCF.

FIG. 18 shows a configuration example of the SCF 114. The SCF 114 shown in FIG. 18 includes a switched capacitor circuit 210 provided between nodes NG1 and NG2, and a switched capacitor circuit 212 and a capacitor CG5 provided between the nodes NG2 and NG5. The SCF 114 also includes capacitors CG4, CG6, and CG7 respectively provided between the nodes NG2 and NG3, nodes NG4 and NG5, and nodes NG1 and NG4. The SCF 114 also includes an operational amplifier OPG1 of which the inverting input terminal is connected with the node NG2 and the noninverting input terminal is connected with a node of the power supply voltage AGND, and an operational amplifier OPG2 of which the inverting input terminal is connected with the node NG4 and the noninverting input terminal is connected with the node of the power supply voltage AGND. Switching elements SG1 to SG6 of the switched capacitor circuits 210, 212, and 214 may be formed using MOS transistors (transfer gates).

The SCF 114 is not limited to the configuration shown in FIG. 18. Various modifications and variations may be made.

In this embodiment, the SCF 114 is operated based on a clock signal corresponding to the reference signal RS (reference signal or a clock signal generated using the reference signal; clock signal having the same frequency as the reference signal). In more detail, non-overlapping two-phase clock signals (sampling clock signals) are generated using the reference signal RS, for example. The SCF 114 is operated by ON/OFF control of the switching elements SG1 to SG6 shown in FIG. 18 based on the generated clock signals.

This enables the operating clock signals of the SCF 114 to be generated by effectively utilizing the reference signal RS, whereby the circuit scale can be reduced. Moreover, since the frequency fd of the reference signal RS coincides with the sampling frequency (clock frequency) of the SCF 114, the design of the frequency characteristics of the filter can be facilitated. When the driving-side resonance frequency fd changes due to a change in environment (change in temperature) or a change with time, the sampling frequency of the SCF 114 changes corresponding to the change in the driving-side resonance frequency fd. Therefore, the cut-off frequency of the SCF 114 can be changed and adjusted corresponding to the change in the frequency fd. As a result, the unnecessary signal having the detuning frequency fd can be reliably removed, even if a change in environment or a change with time occurs.

In this embodiment, different roles are assigned to the respective filters such as removing the unnecessary signal having the detuning frequency fd using the SCF 114 and removing the offset change in the unnecessary signal which appears at the frequency fd, 2fd, 3fd, or the like due to synchronous detection using the prefilter 112 provided for anti-aliasing of the SCF 114, as described above. Specifically, the unnecessary signal for which steep attenuation characteristics are required, such as the unnecessary signal caused by the detuning frequency, is removed using the SCF 114, and the offset change in the unnecessary signal is removed using the prefilter 112. The unnecessary signal can be efficiently removed using a small circuit by distinctly assigning the roles.

9. Offset Adjustment Circuit

Figure 19:
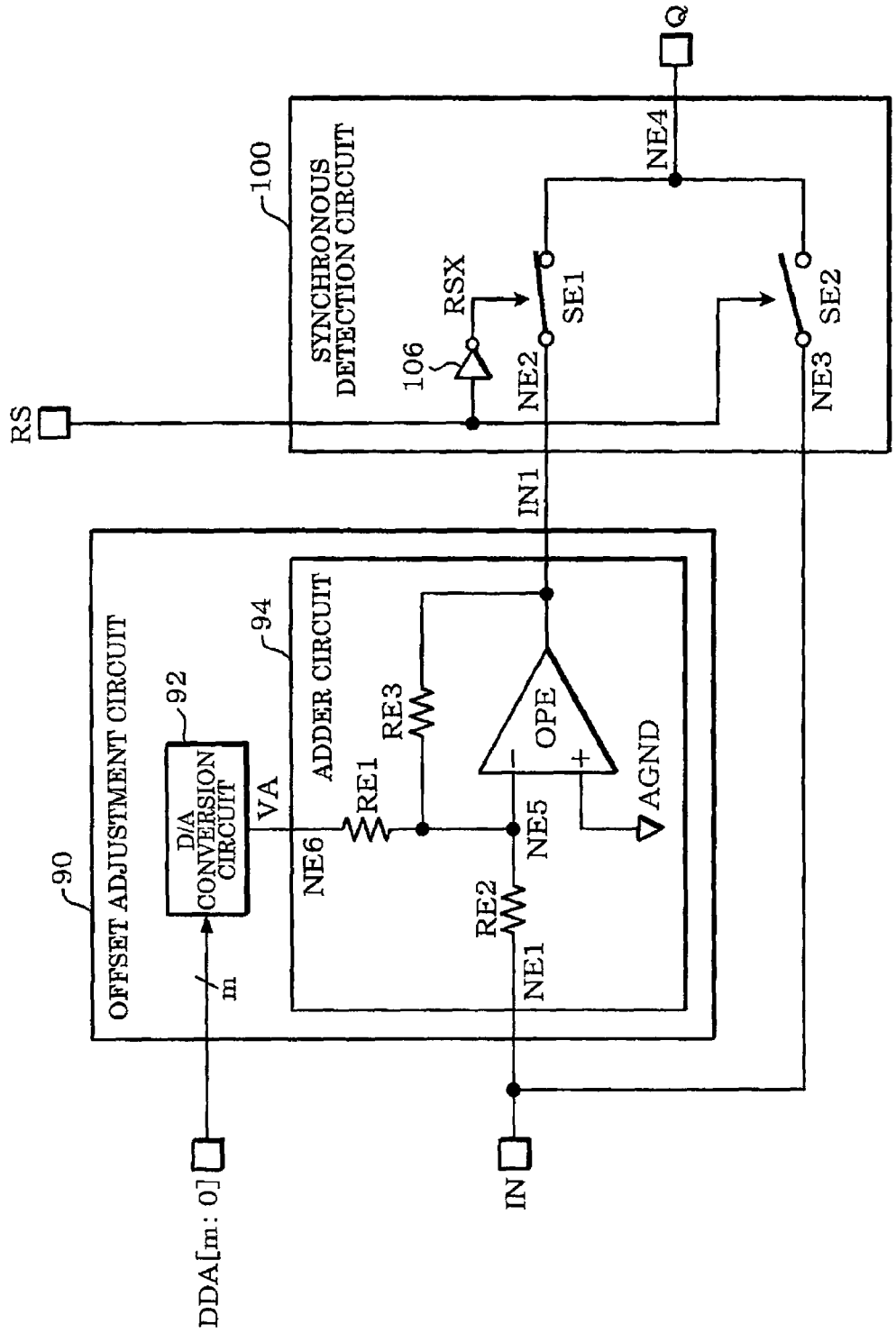
FIG. 19 shows a configuration example of an offset adjustment circuit and a synchronous detection circuit.

FIG. 19 shows a configuration example of the offset adjustment circuit 90. The offset adjustment circuit 90 is not limited to the configuration shown in FIG. 19. Various modification may be made such as changing or omitting some elements or adding other elements.

The offset adjustment circuit 90 includes a D/A conversion circuit 92 and an adder circuit (adder-subtracter circuit) 94. The D/A conversion circuit 90 converts initial offset adjustment data DDA[M:0] into an analog initial offset adjustment voltage VA.

The adder circuit 94 adds the adjustment voltage VA from the D/A conversion circuit 92 to the voltage of the input signal IN (VS4). The adder circuit 94 includes resistors RE1, RE2, and RE3 respectively provided between a node NE5 and nodes NE6, NE1, and NE2. The adder circuit 94 also includes an operational amplifier OPE of which the inverting input terminal is connected with the node NE5 and the noninverting input terminal is connected with a node of the power supply voltage AGND.

In this embodiment, the voltage of the output signal VSQ of the detection device 30 is monitored after manufacturing the gyrosensor. The initial offset adjustment data for causing the voltage of the output signal VSQ to coincide with the reference output voltage is written into a nonvolatile memory (not shown) or the like. The adjustment data DDA[M:0] written into the nonvolatile memory or the like is input to the D/A conversion circuit 92, and the D/A conversion circuit 92 outputs the initial offset adjustment voltage VA corresponding to the adjustment data DDA[M:0]. The adder circuit 94 removes the initial offset voltage by adding the adjustment voltage VA to the voltage of the input signal IN.

As shown in FIG. 19, the offset adjustment circuit 90 is provided in the preceding stage of the synchronous detection circuit 100. The synchronous detection circuit 100 includes switching elements SE1 and SE2 (first and second switching elements) and an inverter 106. The switching elements SE1 and SE2 are formed using MOS transistors (transfer gates).

One end of the switching element SE1 and one end of the switching element SE2 are connected through a node NE4 of the output signal Q (VS6). The output from the adder circuit 94 is input to the other end of the switching element SE1 The input signal IN (signal in the same phase as the input signal IN) is input to the other end of the switching element SE2. The adder circuit 94 of the offset adjustment circuit 90 outputs a signal, which is obtained by adding the adjustment voltage VA to the voltage of the input signal IN and has a phase reverse of that of the input signal IN, to the other end of the switching element SE1.

The switching element SE1 is ON/OFF controlled by an inversion signal RSX of the reference signal RS, and the switching element SE2 is ON/OFF controlled by the reference signal RS. Specifically, the switching element SE2 is turned OFF when the switching element SE1 is turned ON, and the switching element SE2 is turned ON when the switching element SE1 is turned OFF. Synchronous detection is realized by causing the switching elements SE1 and SE2 to be alternately turned ON.

For example, the resistances of the resistors RE1, RE2, and RE3 of the adder circuit 94 are equal. The voltage of the input signal IN is indicated by V1, the initial offset adjustment voltage is indicated by VA, and the output voltage of the adder circuit 94 is indicated by V2. In this case, V2=−(V1+VA) is satisfied. Therefore, when the reference signal RS is set at the H level in FIGS. 6A and 6B so that the switching element SE1 is turned OFF and the switching element SE2 is turned ON, the voltage V1 of the input signal IN is output from the synchronous detection circuit 100. When the reference signal RS is set at the L level so that the switching element SE1 is turned ON and the switching element SE2 is turned OFF, the voltage V2=−(V1+VA) is output from the synchronous detection circuit 100. Specifically, the inversion signal of the signal obtained by adding the adjustment voltage VA to the voltage V1 of the input signal IN is output. This allows addition of the adjustment voltage and synchronous detection to be achieved.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term (e.g. SCF, prefilter, and change in temperature) cited with a different term (e.g. discrete-time filter, continuous-time filter, and change in environment) having a broader meaning or the same meaning at least once in the specification and the drawings can be replaced by the different term in any place in the specification and the drawings. The structure of the vibrator and the configurations of the detection device, the gyrosensor, and the electronic instrument are not limited to those described in the above embodiments. Various modifications and variations may be made. It is also possible to realize the discrete-time filter using a filter (e.g. digital filter) other than the SCF.

What is claimed is:

1. A detection device comprising:
    a driver circuit which drives a vibrator to vibrate; and
    a detection circuit which receives an output signal from the vibrator and detects a desired signal, the detection circuit including:
        an amplifier circuit which amplifies the output signal from the vibrator;
        a sensitivity adjustment circuit which performs sensitivity adjustment by variably controlling a gain; and
        a synchronous detection circuit which performs synchronous detection based on a reference signal;
        the sensitivity adjustment circuit being provided in a preceding stage of the synchronous detection circuit;
    an offset adjustment circuit which performs adjustment for removing an initial offset voltage of an output signal of the detection device; and
    a filter section which filters a signal after synchronous detection;
    wherein the filter section includes:
        a discrete-time filter; and
        a continuous-time filter provided in a preceding stage of the discrete-time filter; and
        wherein the continuous-time filter has frequency characteristics of removing an offset change in an unnecessary signal due to a change in environment.
2. The detection device as defined in claim 1, wherein the continuous-time filter has frequency characteristics of attenuating an offset change in an unnecessary signal which appears in a frequency band of a frequency k×fd (k is a positive integer) due to synchronous detection by the synchronous detection circuit to a value equal to or smaller than amplitude of the desired signal.

3. The detection device as defined in claim 2, wherein the continuous-time filter has frequency characteristics of attenuating offset changes in unnecessary signals which appear in frequency bands of frequencies fd, 2fd, and 3fd to values equal to or smaller than the amplitude of the desired signal.

4. The detection device as defined in claim 2,
wherein the continuous-time filter is a first-order low-pass filter; and
wherein, when the amplitude of the desired signal is A0, the offset change in the unnecessary signal which appears at the frequency k×fd is $\Delta Ak$, and an attenuation factor of the filter at the frequency fd is a, the continuous-time filter has frequency characteristics of attenuating the offset change in the unnecessary signal so that $\Delta Ak \times (a/k) \leq A0$ is satisfied.

5. The detection device as defined in claim 2, wherein the continuous-time filter is a second-order low-pass filter; and wherein, when the amplitude of the desired signal is A0, the offset change in the unnecessary signal which appears at the frequency k×fd is $\Delta Ak$, and an attenuation factor of the filter at the frequency fd is a, the continuous-time filter has frequency characteristics of attenuating the offset change in the unnecessary signal so that $\Delta Ak \times (a/k^2) \leq A0$ is satisfied.

6. The detection device as defined in claim 1, wherein the discrete-time filter is a switched-capacitor filter.

7. The detection device as defined in claim 6, wherein the switched-capacitor filter operates based on a clock signal corresponding to the reference signal.

8. The detection device as defined in claim 1, wherein the discrete-time filter has frequency characteristics of removing a component having a detuning frequency $\Delta f = |fd - fs|$ corresponding to a difference between a driving-side resonance frequency fd and a detection-side resonance frequency fs of the vibrator and allowing a frequency component of the desired signal to pass through.

* * * * *